United States Patent
Odaka et al.

[11] Patent Number: 6,035,054
[45] Date of Patent: *Mar. 7, 2000

[54] VISUAL AXIS DETECTION APPARATUS AND OPTICAL APPARATUS PROVIDED THEREWITH

[75] Inventors: Yukio Odaka, Yokohama; Hiroshi Matsushima, Machida, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/779,908

[22] Filed: Jan. 7, 1997

Related U.S. Application Data

[63] Continuation of application No. 08/536,359, Sep. 29, 1995, abandoned, which is a continuation of application No. 08/141,352, Oct. 26, 1993, abandoned.

[30] Foreign Application Priority Data

Oct. 29, 1992 [JP] Japan .................... 4-291725
Oct. 30, 1992 [JP] Japan .................... 4-314406

[51] Int. Cl.$^7$ ............... G06K 9/00; G03B 13/02
[52] U.S. Cl. ............................. 382/117; 396/51
[58] Field of Search .................. 382/117, 118; 351/205, 200, 210, 211, 206; 396/51

[56] References Cited

U.S. PATENT DOCUMENTS

| | | | |
|---|---|---|---|
| 3,864,030 | 2/1975 | Cornsweet | 351/7 |
| 4,204,255 | 5/1980 | Cremer | 364/425 |
| 4,401,928 | 8/1983 | Kamijo et al. | 318/466 |
| 4,571,050 | 2/1986 | Momiyama | 354/429 |
| 4,689,537 | 8/1987 | Mizuta et al. | 318/466 X |
| 4,749,848 | 6/1988 | Sorimachi | 250/201 |
| 4,754,255 | 6/1988 | Sanders et al. | 340/64 |
| 4,950,069 | 8/1990 | Hutchinson | 354/62 X |
| 5,016,282 | 5/1991 | Tomono et al. | 382/117 |
| 5,036,347 | 7/1991 | Tsunekawa et al. | 354/400 |

(List continued on next page.)

FOREIGN PATENT DOCUMENTS

| | | |
|---|---|---|
| 0480774 | 4/1992 | European Pat. Off. . |
| 4034958 | 5/1991 | Germany . |
| 4205350 | 8/1992 | Germany . |
| 61-61135 | 3/1986 | Japan ............... G03B 3/00 |
| 61-172552 | 8/1986 | Japan ............... A61B 19/00 |
| 1190177 | 7/1989 | Japan . |
| 1-241511 | 9/1989 | Japan ............... G02B 7/11 |
| 1-274736 | 11/1989 | Japan . |
| 2-5 | 1/1990 | Japan ............... G02B 7/28 |
| 3-11492 | 1/1991 | Japan . |
| 3-107909 | 5/1991 | Japan . |
| 4-138432 | 5/1992 | Japan . |
| 4242630 | 8/1992 | Japan . |
| 4-347128 | 12/1992 | Japan ............... A61B 3/113 |
| 4-347131 | 12/1992 | Japan ............... A61B 3/113 |
| 1380355 | 1/1975 | United Kingdom . |
| 2117594 | 10/1983 | United Kingdom . |
| 2177276 | 1/1987 | United Kingdom . |

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

The invention relates to a visual axis detection apparatus and the like which is constituted by light receiving device for receiving image of an observer's eye, read-out device for reading out the photoelectric conversion signals from the light receiving device, information processing device for extracting a plurality of characteristic information on the basis of the signals read out by the read-out device and outputting information regarding the direction of the observer's visual axis and restricting device for giving a restriction to the read-out area of the light receiving device.

29 Claims, 25 Drawing Sheets

U.S. PATENT DOCUMENTS

| | | | |
|---|---|---|---|
| 5,182,443 | 1/1993 | Suda et al. | 250/201.1 |
| 5,214,466 | 5/1993 | Nagano et al. | 354/402 |
| 5,225,862 | 7/1993 | Nagano et al. | 354/400 |
| 5,235,380 | 8/1993 | Yamada et al. | 354/409 X |
| 5,245,371 | 9/1993 | Nagano et al. | 354/195.1 |
| 5,245,381 | 9/1993 | Takagi et al. | 354/219 X |
| 5,253,008 | 10/1993 | Konishi et al. | 354/402 |
| 5,260,734 | 11/1993 | Shindo | 354/219 |
| 5,262,807 | 11/1993 | Shindo | 351/210 |
| 5,280,312 | 1/1994 | Yamada et al. | 351/200 |
| 5,296,888 | 3/1994 | Yamada | 354/402 |
| 5,298,927 | 3/1994 | Konishi et al. | 351/211 |
| 5,335,035 | 8/1994 | Maeda | 354/219 |
| 5,386,258 | 1/1995 | Nagano | 354/400 |
| 5,428,413 | 6/1995 | Shindo | 351/210 |
| 5,486,892 | 1/1996 | Suzuki | 396/51 |
| 5,508,759 | 4/1996 | Konishi | 351/206 |
| 5,534,688 | 7/1996 | Kusaka | 256/201.8 |
| 5,579,079 | 11/1996 | Yamada et al. | 396/51 |

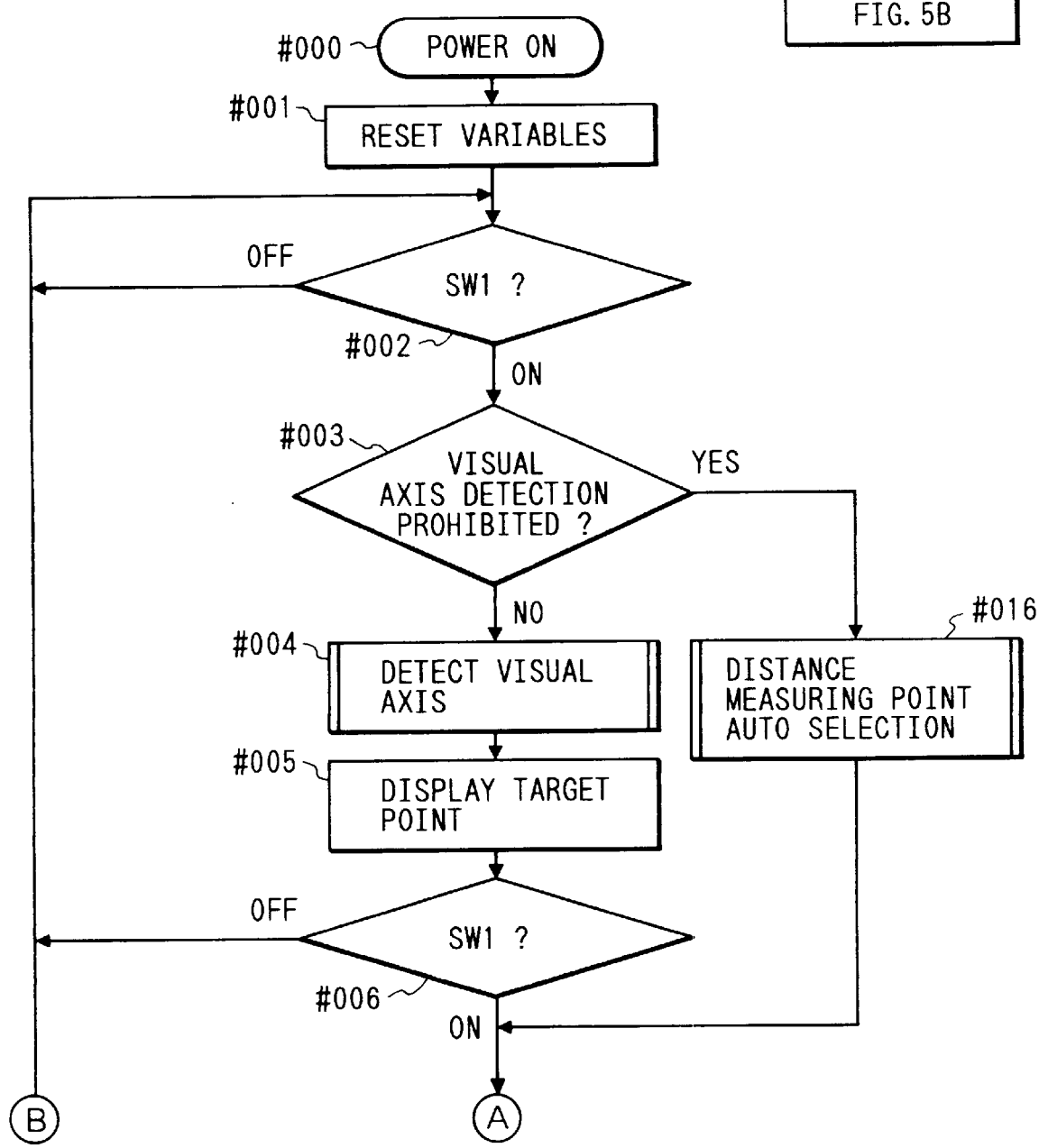

| FIG. 11A-1 |
| FIG. 11A-2 |

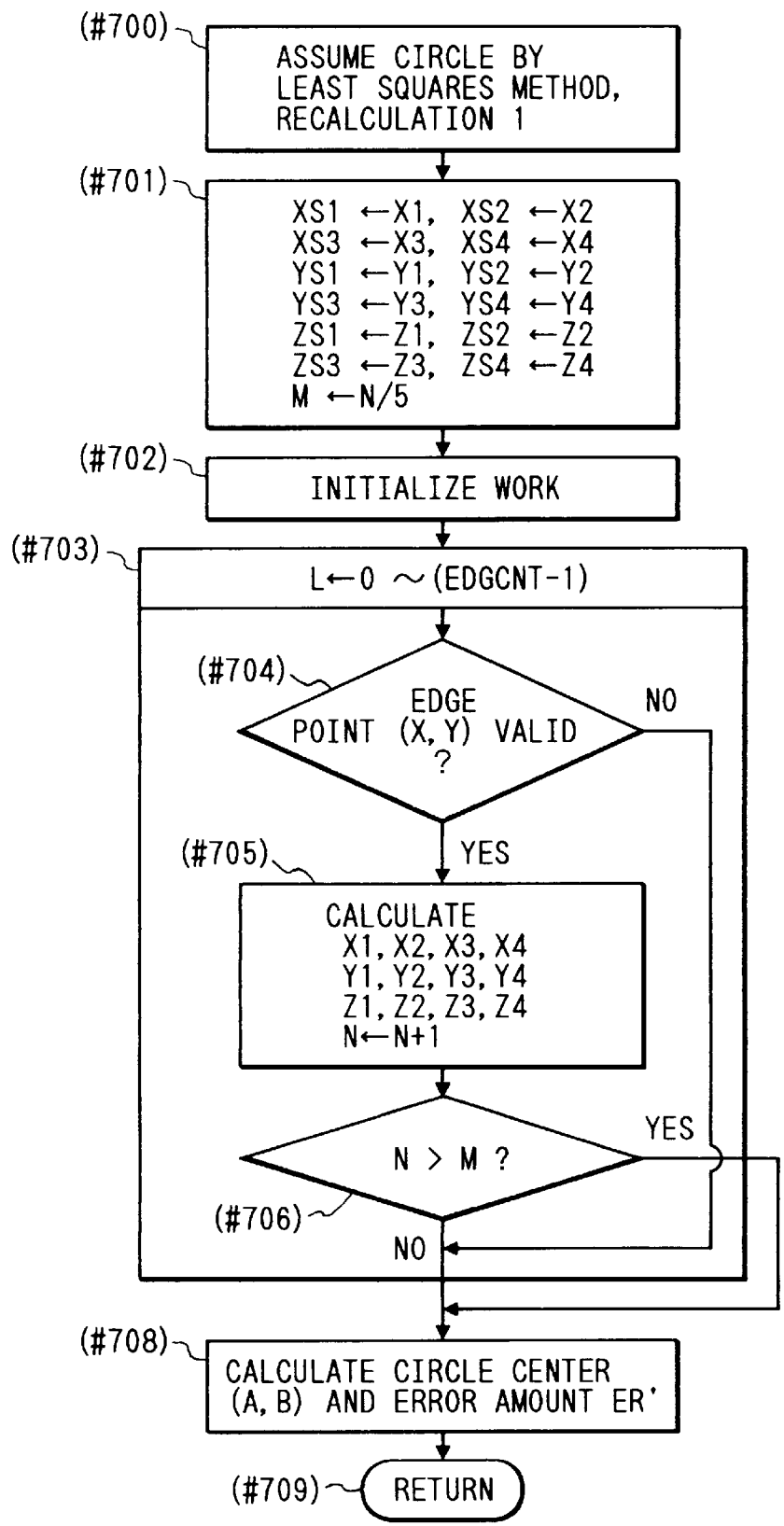

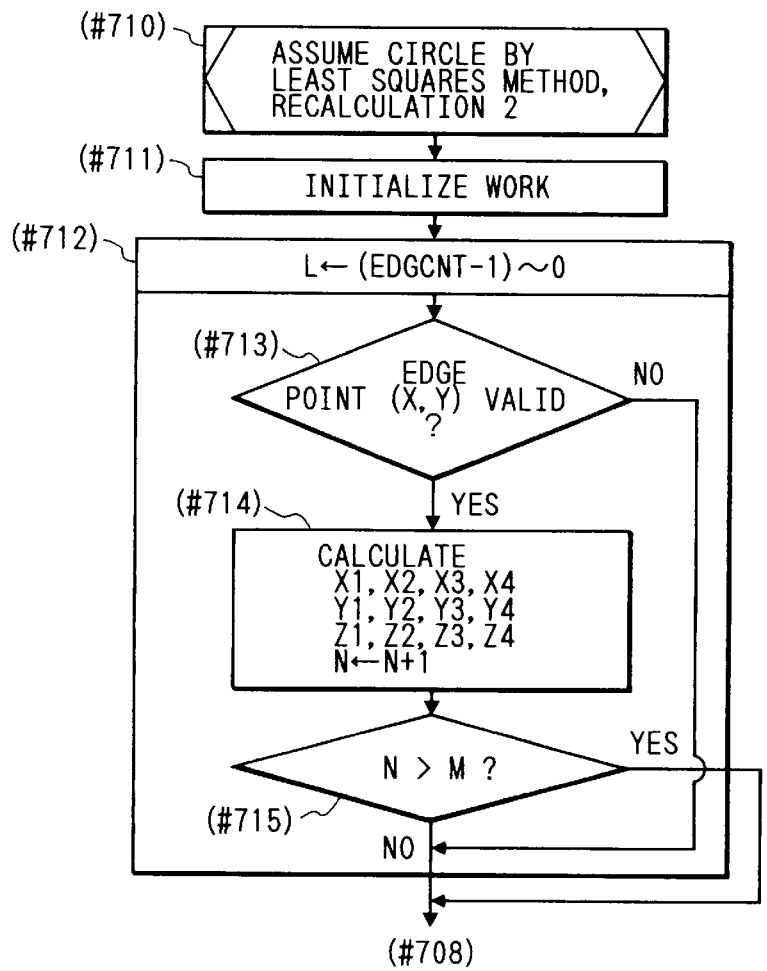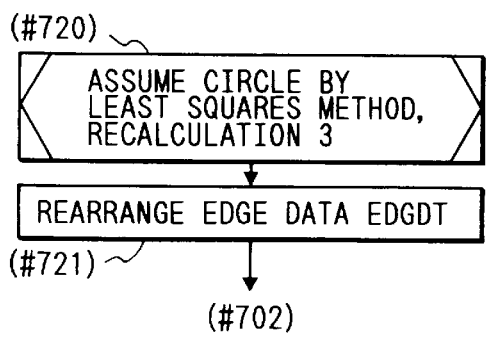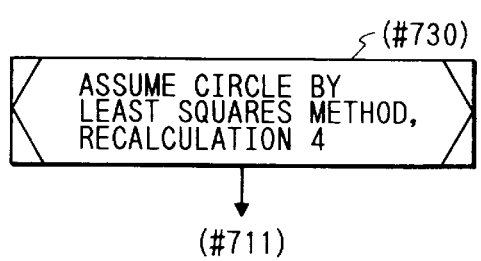

VISUAL AXIS DETECTION APPARATUS AND OPTICAL APPARATUS PROVIDED THEREWITH

This application is a continuation of Application Ser. No. 08/536,359 filed Sep. 29, 1995, which is a continuation of Ser. No. 08/141,352 filed Oct. 26, 1993, both now abandoned.

BACKGROUND OF THE INVENTION

1. Field of the Invention

The present invention relates to a visual axis detection apparatus used for a film, a camera, a video camera, a still video camera, an observation equipment, or the like, and also, to an optical apparatus provided therewith.

2. Related Background Art

There has hitherto been known a camera provided with a visual axis detection means which is mounted in a part of the camera for detecting the visual axis direction of a photographer for the detection of an area (position) where the photographer is observing in the finder field, the so-called photographer's target direction, and then, the various photographing functions, such as an automatic focus adjustment, an automatic exposure, are controlled among others in accordance with signals from the visual axis detection means thus arranged.

In this respect, the so-called visual axis detection apparatus with which to detect the position being observed by an observer on the observation plane of an optical apparatus disclosed in Japanese Patent Laid-Open Application No. 61-61135, Japanese Patent Laid-Open Application No. 61-172552, Japanese Patent Laid-Open Application No. 1-241511, and Japanese Patent Laid-Open Application No. 2-5 among some others.

In the Japanese Patent Laid-Open Application No. 61-61135, for example, a camera is disclosed, in which the distance measuring direction of a focal point detection apparatus is controlled by the output from a visual axis detection means in order to adjust the state of the focal point in the photographing system.

Also, in a specific example disclosed in the Japanese Patent Laid-Open Application No. 1-241511, there is proposed a camera comprising visual axis detection means for detecting the photographer's target direction, focal point detection means having a plurality of distance measuring fields, and automatic exposure control means having a plurality of photometric sensitivity distributions, thus controlling the driving of the focal point detection means, and then, the automatic exposure control means in accordance with the output of the visual axis detection means.

For the auto-focus operation provided for a camera, it has hitherto been in practice that a focal point detection is executed until a photographing lens is brought in the in-focus state, and then, after the lens is once in the in-focus state, there are two operations to follow, that is, one-shot operation which does not require any focal point detection, and a servo operation which continues the execution of the focal point detection irrespective of the in-focus state of the photographing lens.

The one-shot operation is a mode mainly used when an object does not move.

The operation of the one-shot mode of an auto-focus camera having an incorporated visual axis detection apparatus is executed in the following manner.

At first, a release switch is slightly depressed to turn on a switch SW1. Then, before any focal point detection, the photographer's target point in the finder is obtained by use of the visual axis detection apparatus. In this procedure, the sensor accumulation is executed for the visual axis detection means which comprises a CCD line sensor and the like in order to read out image signals. Based upon such image signals, the visual axis direction of the photographer is obtained.

Subsequently, from the visual axis direction thus obtained, the part to which the photographer's attention is directed in the finder, that is, the photographer's target point is calculated. This target point is represented by the coordinates in the finder.

Hence, this method is to determine the corresponding measuring distance point from the coordinates in the finder.

In this way, the against measuring distance point obtained by use of the visual axis detection means, the focal point detection apparatus detects the state of the focal point detection. On the basis of such information, the photographing lens is driven until it is brought in the in-focus state. Once the measuring distance point is determined by use of the visual axis detection apparatus, the focusing operation will be executed until coming into focus by merely giving attention to the in-focus state at such measuring distance point.

Now, the servo operation is a mode mainly used while an object is moving.

The operation is executed in the following manner for the servo mode of an auto-focus camera having a conventional visual axis detection apparatus.

In the same way as the one-shot operation, the measuring distance point is determined by use of the visual axis detection means immediately after the switch SW1 is turned on. On the basis of the information obtained by the focal point detecting operation for such measuring distance point, the lens is driven, and then, the operation will continue.

However, since the object is apt to move when the servo mode is executed, there are some cases where the object may be out of the measuring distance point thus obtained. Also, in the servo mode, it is occasionally desired that the related composition should be modified while bringing the object in focus.

In order to attain this aim, the photographer's target point should be extracted at certain intervals. By each interval it is extracted, the focal point state in the related area must be detected so that the photographing lens is driven on the basis of such an information. Nevertheless, to obtain a desirable precision, there are many numbers of pixels in the sensor which are needed for the detection of the light intensity distribution in the two-dimensional directions in order to photodetect the image of the photographer's eyeball. Inevitably, therefore, it takes an extremely long time to execute the required reading and processing operations.

As a result, the processing cycle becomes longer due to the long time required for the execution of the visual axis detection operation, hence presenting a problem that the servo AF (Auto Focus) responsibility is lowered, and that the speed with which to feed the frames is slower in taking pictures in continuation.

Also, in a visual axis detection apparatus specifically exemplified in Japanese Patent Laid-Open Application No. 4-347128 (corresponding to Japanese Patent Application No. 3-121092), not all the pieces of image information are stored in a memory at once, but stored in it sequentially while reading the photoelectric signals which are being output from the sensor in time series. The reading is once paused for processing when the information is secured in an amount which is good enough for the current execution. Then, the processed image information is not held in the memory as it is, but new photoelectric conversion signals will be stored. In this way, even in a case where only a limited capacity of memory is usable, it is possible to process all the information available.

Now, when the visual axis direction is detected by processing the image signals from the area sensor comprising a plurality of the photoelectric conversion element arrays, there is a problem that it takes an enormous amount of time if the characteristic points of image (minimum luminance sections, pupil's edge, and Purkinje images, for example) are to be detected over the entire sensor area because of the extremely great number of the photoelectric conversion elements (pixels).

SUMMARY OF THE INVENTION

One aspect of the invention is to provide a visual axis detection apparatus capable of significantly reducing the detection time to obtain the positional information required for the visual axis detection.

One aspect of the invention is to provide a visual axis detection unit having a reduced period of a visual detection time, and to equip an apparatus capable of actuating at least one function by the output of the visual axis detection unit.

One aspect of the invention is that an apparatus is provided with image receiving means to receive the image of a photographer's eye; reading means to read the photoelectric conversion signals being output from the image receiving means; and calculating means to extract a plurality of characteristic information from the photoelectric conversion signals, and calculate the information regarding the observer's visual axis direction from such extracted pieces of information, and then, this apparatus is improved by providing control means which adds restrictions to the reading range of the image receiving means. In this respect, it may be possible to paraphrase the expression "visual axis direction" as a gazing point on a displayed image. Here, the reading range specified by the control means is a range having a given length from the center of a pupil or a range having a certain multiple of the radius of the pupil. Also, the above-mentioned apparatus is further provided with determining means to determine whether or not the visual axis detection is possible by Judging if the characteristic information is rational while a calculation is being executed by calculating means or the calculated result is rational as a result of the calculation which is still in progress. It may be possible for the determining means to provide a function to clear the restrictions of the control means.

Further, one aspect of the invention is that an apparatus is provided with image receiving means to receive the image of an observer's eye; storage means to store the photoelectric conversion information from the image receiving means; characteristic point position detecting means to detect a plurality of positional information regarding characteristic points and store them in the storage means; and calculating means to calculate the information regarding the visual axis direction on the basis of the stored positional information, and then the apparatus is improved by providing detection range controlling means in the characteristic point position detecting means so that the detection range is restricted to the one which matches the respective characteristic point when each of the characteristic points are detected.

Further aspects of the invention will be clear from the specific examples to be described later.

BRIEF DESCRIPTION OF THE DRAWINGS

FIGS. 11A-1, 11A-2 and 11B are flowcharts showing the pupil's center detecting operation in the flowcharts shown in FIGS. 5A and 5B.

FIGS. 13A, 13B, 13C, and 13D are flowcharts showing the least square recalculating operations 1 to 4 for the circle shown in FIGS. 11A-1 and 11A-2.

DETAILED DESCRIPTION OF THE PREFERRED EMBODIMENTS

Figure 2:
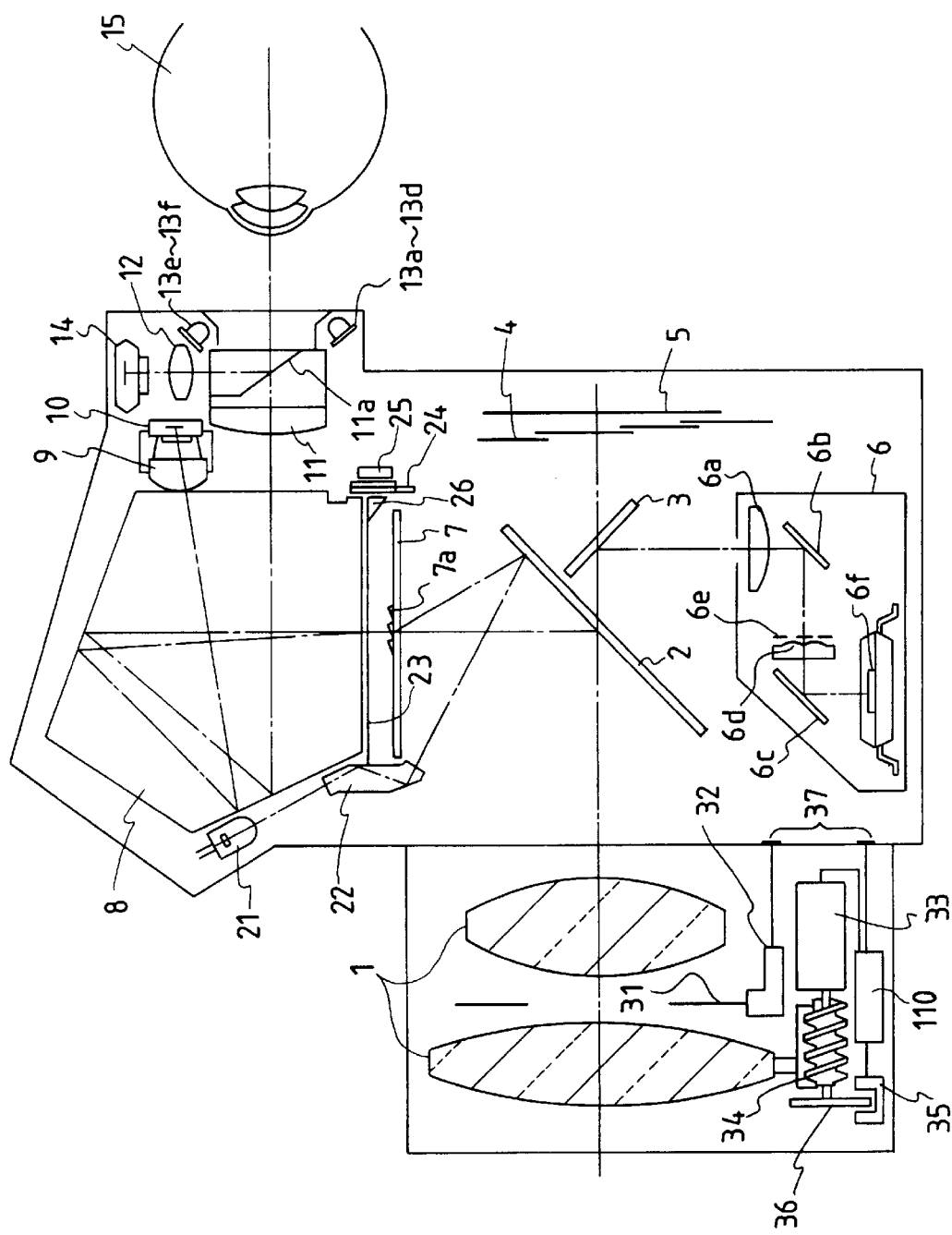
FIG. 2 is a view schematically showing the principal part of a camera in which the present invention can be effectively implemented.

FIG. 2 is a cross-sectional view showing the optical configuration of a first embodiment in which the present invention is applied to a single-lens reflex camera.

In FIG. 2, a reference numeral 1 designates a photographing lens which is represented by two lenses for the sake of convenience. Actually, however, this lens comprises many more lenses. A reference numeral 2 designates a main mirror which is installed to be inclinable to or retractable from the photographing light path depending on the observation state of an objective image and the photographing state thereof; and 3, a sub-mirror which reflects the luminous flux transmitting through the main mirror 2 to a focal point detection apparatus 6 which is arranged in the lower part of the camera body.

A reference numeral 4 designates a shutter; and 5, a photosensitive member comprising a silver salt film or a solid state photographing element such as CCD or MOS type or a videcon or other imaging tubes. A reference numeral 6 designates a focal point detection apparatus comprising a field lens 6a arranged in the vicinity of the image formation plane, reflection mirrors 6b and 6c, a secondary image formation lens 6d, diaphragm 6e, a line sensor formed by a plurality of CCDs, and others.

Figure 3:
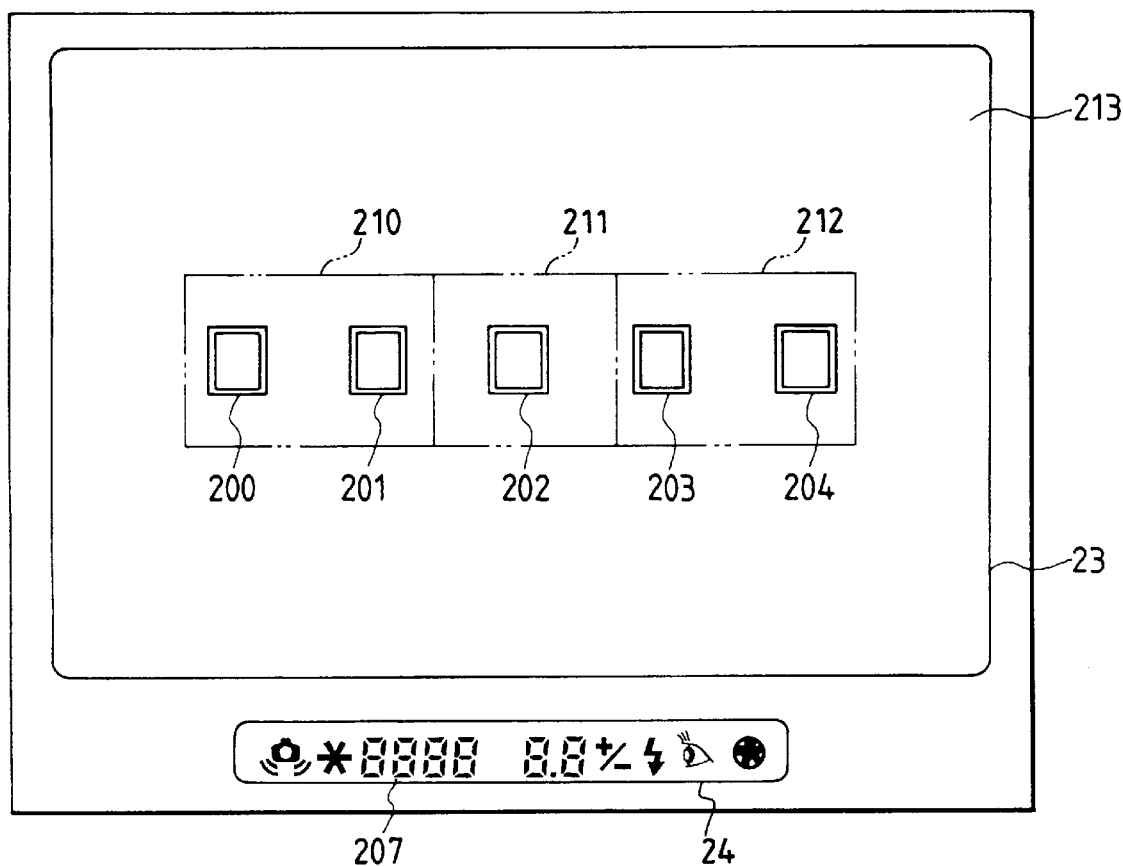
FIG. 3 is a view showing the interior of the finder of the camera shown in FIG. 2.

In the present embodiment, the focal point detection apparatus 6 uses the known phase differential method, and as shown in FIG. 3, the apparatus is structured to define the plural areas (five locations) in the observing plane (in the finder view) as measuring distance points, and to make these measuring distance points detectable as focal points.

A reference numeral 7 designates a focusing plate arranged on the anticipated image formation plane of the photographing lens 1; 8, a pentagonal prism for altering the finder light paths; and 9 and 10, an imaging lens and a photometric sensor, respectively, for measuring the luminance of an object in the observing plane. The imaging lens 9 enables the focusing plate 7 and photometric sensor 10 to be conjugately related through the reflection light path in the pentagonal prism 8.

Behind the exit plane of the pentagonal prism 8, an eye piece 11 having a light splitter 11a is arranged for the observation of the focusing plate 7 by the photographer's eye 15. The light splitter 11a is formed by a dichroic mirror which transmits a visible light but reflects the infrared light, for example.

A reference numeral 12 designates a light receiving lens; 14, an image sensor having two-dimensionally arranged photoelectric element array of CCDs or the like, which is conjugately arranged in the vicinity of the photographer's eye 15 located in a given position with respect to the light receiving lens 12; and 13a to 13f, the infrared light emitting diodes which serve as illuminating light sources, respectively.

A reference numeral 21 designates a superimpose LED of a high luminance which is visibly recognizable even in a bright object, and the emitted light reaches the photographer's eye 15 through a projecting prism 22, reflected by the main mirror 2, bent in the vertical direction by the fine prism array 7a provided in the display unit of the focusing plate 7, and through the pentagonal prism 8 and the eye piece 11.

In this respect, the fine prism array 7a is arranged in the form of a frame each in plural positions (measuring distance points) corresponding to the focal point detection areas in the focusing plate 7. These arrays are illuminated by five superimpose LEDs 21 (designated as LED-L1, LED-L2, LED-C, LED-R1, and LED-R2, respectively) which correspond to each of the frames.

In this way, as readily understandable from the finder field shown in FIG. 3, each of the measuring distance point marks 200, 201, 202, 203, and 204 becomes luminous in the finder field so that the focal point detection areas (measuring distance points) can be indicated (hereinafter, this is referred to as superpose indication).

A reference numeral 23 designates a field mask which forms the finder field area; and 24, a finder inner LCD for displaying the photographic information outside the finder field, which is illuminated by an illumination LED (F-LED) 25.

The light which has passed the LCD 24 is guided into the finder field through a triangular prism 26, and displayed outside the finder field as shown at 207 in FIG. 3, thus enabling the photographer to know the photographic information.

A reference numeral 31 designates a diaphragm arranged in the photographing lens 1; 32, a driving apparatus including the diaphragm driving circuit 111 which will be described later; 33, a lens driving motor; 34, a lens driving member comprising a driving gear and others; and 35 is a photocoupler which detects the rotation of the pulsing board 36 which is interlocked with the lens driving member, and transmits it to a lens focal point adjustment circuit 110. The focal point adjustment circuit 110 causes the lens driving motor to be driven for a given amount in accordance with this information as well as the information regarding the lens driving amount from the camera side, thus shifting the photographing lens 1 to the in-focus position. In this respect, a reference numeral 37 designates a known mount contact which serves as an interface between the camera and lens.

Figure 4:
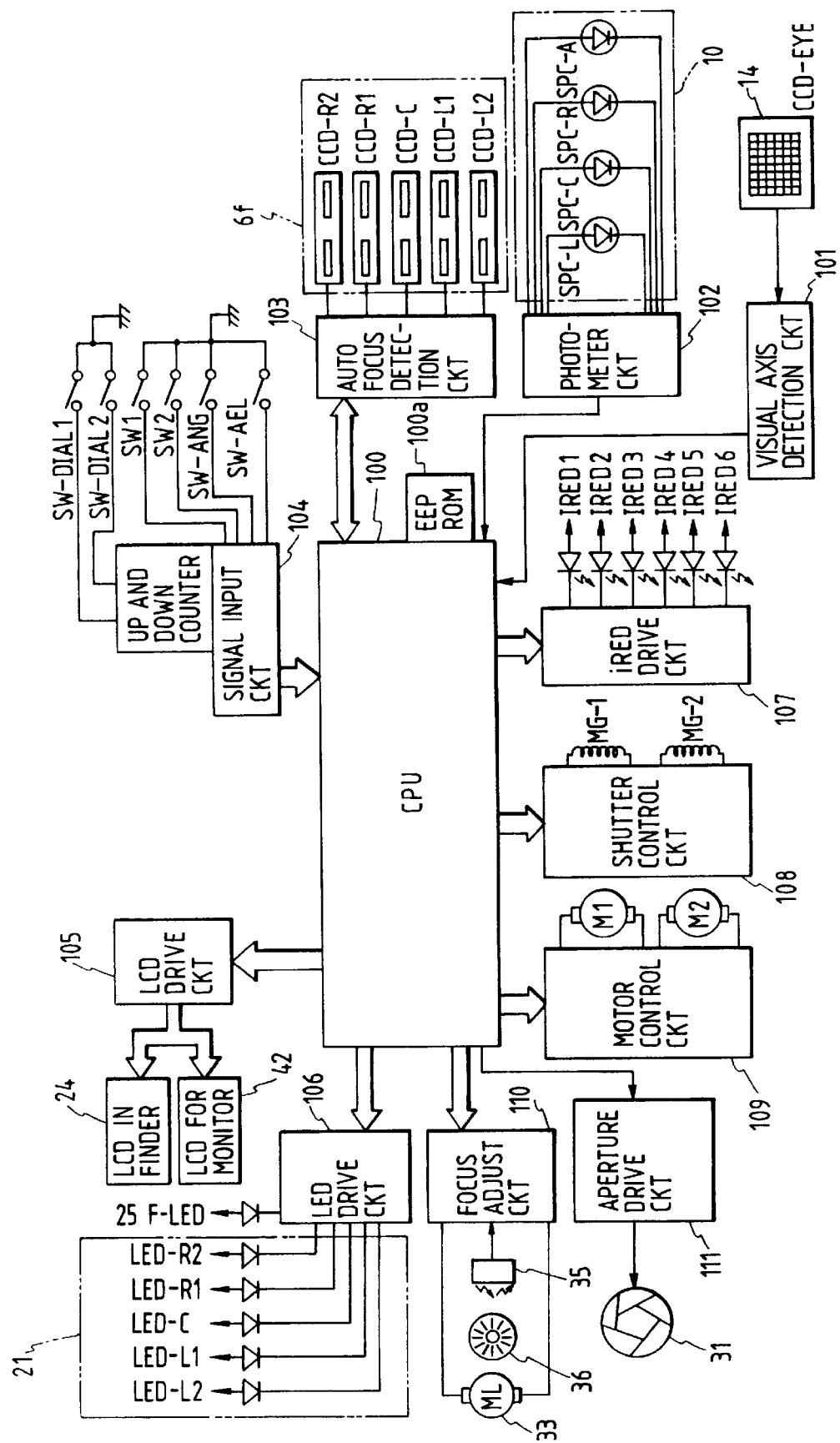
FIG. 4 is the electric circuit of the camera shown in FIG. 2.

FIG. 4 is a block diagram showing the electric circuit of the camera shown in FIG. 2, in which the same reference marks are provided for the elements which are the same as those shown in FIG. 2.

To the central processing unit (hereinafter referred to as CPU) 100 of a microcomputer incorporated in the camera main body, there are connected a visual axis detection circuit 101, a photometric circuit 102, an automatic focal point detection circuit 103, a signal input circuit 104, an LCD driving circuit 105, and an LED driving circuit 106, an IRED driving circuit 107, a shutter control circuit 108, and a motor control circuit 109. Also, through the mount contact 37 shown in FIG. 3, the focal point adjustment circuit 110 arranged in the photographing lens 1 and the diaphragm driving circuit 111 execute the transmission of signals.

An EEPROM 100a attached to the CPU 100 has a storage function as storing means to store visual axis correction data with which to correct the individual difference in the visual axis.

The visual axis detection circuit 101 A/D converts the eyeball image output from an image sensor 14 (CCD-EYE), and transmits this image information to the CPU 100. The CPU 100 extracts each of the characteristic points of the eyeball image which are needed for the visual axis detection in accordance with a given algorithm as described later. Further, the CPU calculates the visual axis of the photographer on the basis of the positions of the respective characteristic points.

After the output from the photometric sensor 10 is amplified, the photometric circuit 102 compresses it logarithmically and transfers it to the CPU 100 as the luminance information of each sensor subsequent to its A/D conversion. The photometric sensor 10 comprises the photodiodes which photometrically measure four areas, that is, the SPC-L which photometrically measures the left-hand area 210 including the left-side measuring distance points 200 and 201 in the finder view as shown in FIG. 3; the SPC-C which photometrically measures the central area 211 including the measuring distance point 202 in the center; the SPC-R which photometrically measures the right-hand area 212 including the right-side measuring distance points 203 and 204; and the SPC-A which photometrically measures the circumference 213 of these areas.

The line sensor 6f shown in FIG. 4 is a known CCD line sensor comprising the five sets of line sensors CCD-L2, CCD-L1, CCD-C, CCD-R1, and CCD-R2which correspond to the five measuring distance points 200 to 204 in the image plane as shown in FIG. 3.

The automatic focal point detection circuit 103 A/D converts the voltage obtained from these line sensors 6f to transmit it to the CPU 100. A reference mark SW-1 designates a switch which is turned on by the first stroke of a release button to start the photometry, AF, visual axis detecting operation, and others; SW-2, a release switch which is turned on by the second stroke of the release button; SW-AEL, an AE lock switch which is turned on by depressing an AE lock button; and SW-DIAL1 and SW-DIAL2, the dial switches provided in an electronic dial (not shown), the output of which is inputted into the up-down counter of the signal input circuit 104 to count the clicking amounts of the electronic dial.

A reference numeral 105 designates the known LCD driving circuit which drives the liquid crystal indication element LCD to display the diaphragm value, shutter seconds, set photographing mode, and others both on the monitoring LCD 42 and the LCD 24 in the finder simultaneously in accordance with signals from the CPU 100. The LED driving circuit 106 controls the illumination LED (F-LED) 25 and the superimpose LED 21 to illuminate or blink. The IRED driving circuit 107 selectively illuminates the infrared light emitting diodes (IRED1 to 6) 13a to 13f depending on the circumstances.

When charged, the shutter control circuit 108 controls the magnet MG-1 which enables the first blade to run, and the magnet MG-2 which enables the second blade to run, thus allowing the photosensitive member to be exposed in a given luminous energy. The motor control circuit 109 is to control a motor M-1 for the execution of film wind up and rewind, and also, controls a motor M-2 for operating the main mirror 2 and the shutter 4. By use of the shutter control circuit 108 and motor control circuit 109, a series of release sequence operations are executed for the camera.

Figure 15:
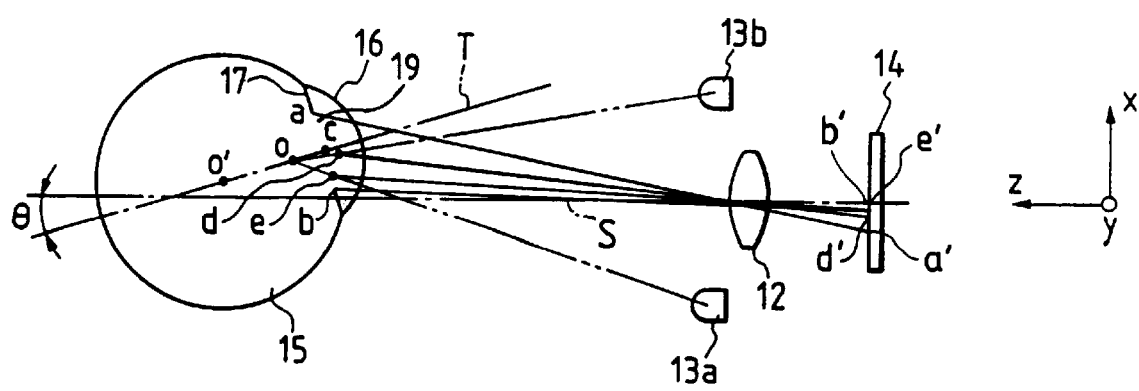
FIG. 15 is a view illustrating a visual axis detection method.

FIG. 15 is a view illustrating the principle of a visual axis detection method.

Figure 1A:
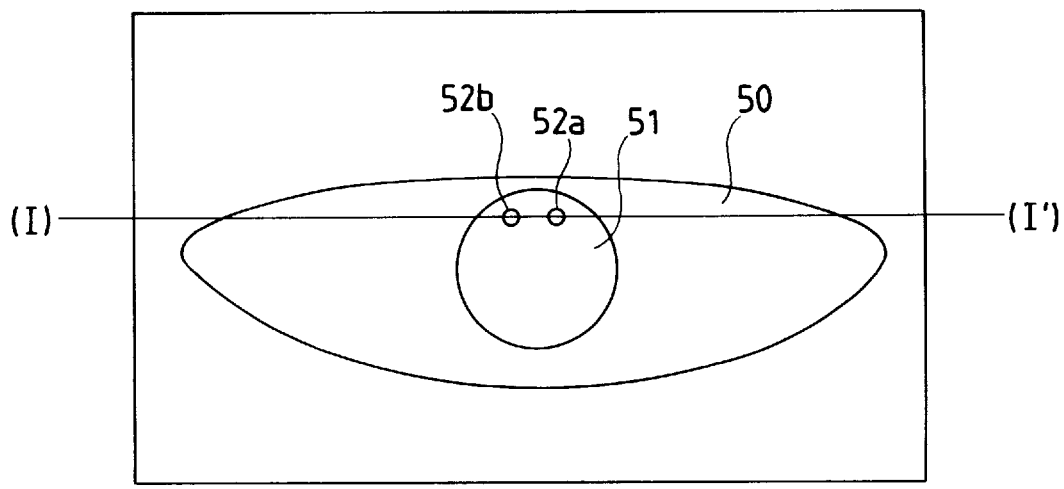
FIGS. 1A and 1B are views showing one example of an eyeball image which is projected on an image sensor.
Figure 1B:
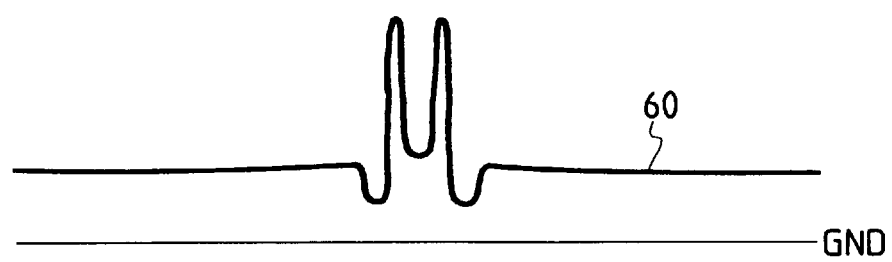

FIG. 1A shows an eyeball image projected on the surface of an image sensor 14 shown in FIG. 15. In FIG. 1B, a reference numeral 60 designates the output of an image signal taken along the line (I)–(I') in FIG. 1A.

In FIG. 1A, a reference numeral 50 designates the so-called white of the eye; 51, the pupil; and 52a and 52b, the reflection images of the cornea formed by the eyeball illuminating source.

Now, in conjunction with FIG. 15, FIGS. 1A and 1B, the visual axis detection method will be described. Each of the infrared light emitting diodes 13a and 13b is arranged symmetrically in the direction Z of the optical axis S of the light receiving lens 12, and illuminates the photographer's eye ball divergently.

The infrared light emitted from the infrared light emitting diode 13b illuminates the cornea 16 of the eye ball 15. At this juncture, the cornea reflection image d formed by a part of the infrared light reflected on the surface of the cornea 16 is converged by the light receiving lens 12 to reimage it at the position d' on an image sensor 14.

Likewise, the infrared light emitted from the infrared light emitting diode 13a illuminates the cornea 16 of the eye ball. At this juncture, the cornea reflection image e formed by a part of the infrared light reflected on the surface of the cornea 16 is converged by the light receiving lens 12 to reimage it at the position e' on an image sensor 14.

Also, the luminous fluxes from the ends a and b of the iris 17 form the images of the ends a and b at the positions a' and b' on the image sensor 14 through the light receiving lens 12. When the rotational angle θ of the optical axis T of the eye ball 15 is small with respect to the optical axis (optical axis S) of the light receiving lens 12, the coordinates Zc in the central position c of the pupil 19 is expressed as $$Zc \simeq (Za+Zb)/2$$

where the coordinates Z at the ends a and b of the iris 17 are Za and Zb.

Also, the coordinates Z at the center point of the cornea reflection images d and e and the coordinates $Z_O$ at the curvature center O of the cornea 16 agree with each other. Therefore, given the coordinates Z at the position d and e where the cornea images are generated as Zd and Ze; the standard distance from the curvature center O of the cornea 16 to the center C of the pupil 19 as $L_{OC}$; and the coefficient which takes the individual difference with respect to the distance $L_{OC}$ as A1, the rotational angle θ of the optical axis T of the eyeball almost satisfies the following relational equations:

$$(A1*L_{OC})* \sin θ \simeq Zc-(Zd+Ze)/2 \qquad (1)$$

Therefore, in a visual axis arithmetic processing apparatus, it is possible to obtain the rotational angle θ of the optical axis T of the eye ball by detecting each characteristic point (cornea reflection images d and e, and the iris ends a and b) projected on a part of the image sensor. In this case, the equation (1) can be rewritten as follows:

$$β(A1*L_{OC}) \times \sin θ \simeq (Za'+Zb')/2 - (Zd'+Ze')/2 \qquad (2)$$

where β is a magnification determined by the eye ball position with respect to the light receiving lens 12. This is essentially obtainable as the coefficient of an interval |Zd'+Ze'| of the cornea reflection images. The rotational angle θ of the eye ball 15 can be rewritten as $$θ \simeq ARCSIN\{(Zc'-Zf')/β(A1*L_{OC})\} \qquad (3)$$

However, $$Zc' \simeq (Za'+Zb')/2$$

$$Zf' \simeq (Zd'+Ze')/2$$

In this respect, since the optical axis T and the visual axis of the photographer's eyeball do not agree with each other, the visual axis θH of the photographer in the horizontal direction is obtainable by giving an angle correction δ for the optical axis and visual axis of the eyeball once the rotational angle θ of the optical axis T of the photographer's eyeball in the horizontal direction is calculated. Now, given the coefficient for the consideration of the individual difference with respect to the correction angle δ for the optical axis T and visual axis of the eyeball as B1, the photographer's visual axis θH in the horizontal direction is obtained as follows:

$$θH = θ \pm (B1*δ) \qquad (4)$$

Here, assuming that the rotational angle is positive when turning to the right with respect to the photographer, the mark + is selected for the left eye of the photographer's eyes with which to look in at an observation apparatus, and the mark − is selected if the right eye is used for the purpose.

In FIG. 15, an example in which the photographer's eyeball rotates in the Z-X plane (a horizontal plane, for instance) is shown, but it is possible to execute the detection in the same manner even if the photographer's eyeball rotates in the X-Y plane (a vertical plane, for instance). However, since the component in the vertical direction of the photographer's visual axis agrees with the component θ' in the vertical direction of the eyeball, the visual axis θV will be:

$$\theta V = \theta'$$

Further, the positions (Zn and Yn) on the focusing plate in the finder field at which the photographer looks with the visual axis data θH and θV are as follows:

$$Zn \simeq m * \theta H \quad (5)$$
$$\simeq m * [ARCSIN\{(Zc' - Zf')/\beta(A1 * L_{OC})\} \pm (B1 * \delta)]$$
$$Yn \simeq m * \theta V$$

where m is a constant which is defined depending on the finder system of a camera.

Here, the values of the coefficients A1 and B1 for the correction of the individual difference in the photographer's eyeball are obtained when the photographer is requested to gaze alternately at the two targets which are arranged in given positions in the camera finder, and then, to match the positions of the targets with the positions of the gazing points which have been calculated in accordance with the equation (5).

In the present embodiment, the operation to obtain the visual axis and the target point of the photographer is executed in accordance with each of the foregoing equations by the application of the microcomputer software prepared for the visual axis arithmetic processing apparatus.

With the coefficient for the correction of the individual difference in the visual axis thus obtained, the positions on the focusing plate of the visual axis of the observer who looks in the camera finder are calculated using the equation (5). The visual axis information is utilized for the focal point adjustment of the photographing lens, or the exposure control and others.

Figure 5B:
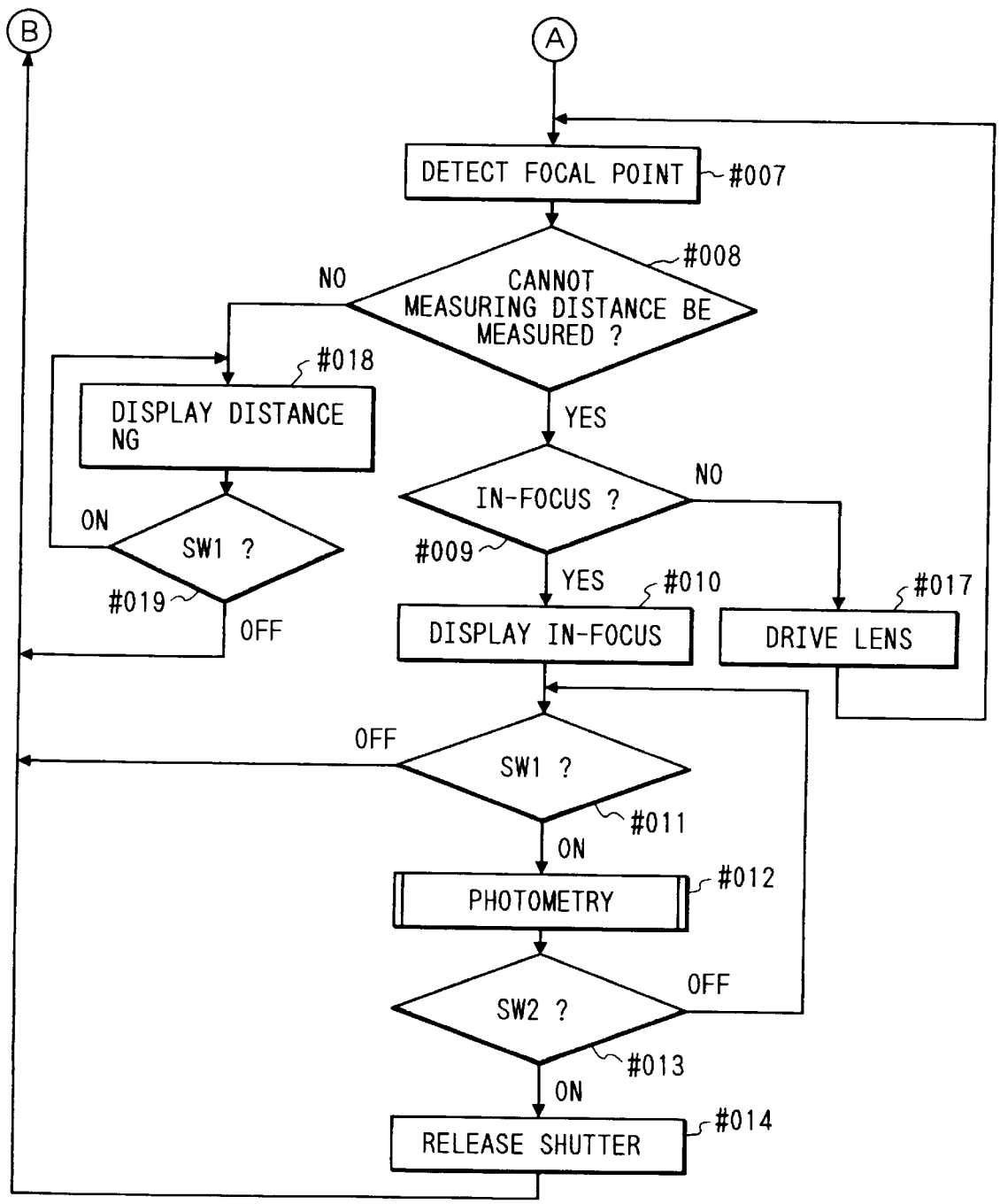
FIG. 5 is comprised of FIG. 5A and FIG. 5B showing flowcharts illustrating the entire operation of the camera shown in FIG. 2.

Now, an operational flowchart of the camera which has a visual axis detection apparatus is shown in FIGS. 5A and 5B. The description will be made of the operation of such camera in accordance with the flowchart.

When a mode dial (not shown) is turned to set the camera from the inactive state to a given photographing mode (in the present embodiment, the description will be made of a case where the mode is set for the shutter preference AE), the power source of the camera is turned on (#000). The variables to be used for the visual axis detection by the CPU 100 are reset (#001).

Then, the camera will be on standby until the release button is depressed to turn on the switch SW1 (#002). When the signal input circuit 104 detects that the release button 41 is depressed so that the switch SW1 is turned on, the CPU 100 will confirm it by means of the visual axis detection circuit 101 (#003).

At this juncture, if the mode is set in a visual axis prohibition, no visual axis detection will be executed. In other words, a specific measuring distance point is selected by the distance measuring selection subroutine without using any visual axis information (#016). At this measuring distance point, the automatic focal point detection circuit 103 executes a focal point detecting operation (#007).

There are provided both a photographing mode in which the measuring distance point is selected without using any visual axis information (that is, the visual axis prohibition automatic focus photographing mode), and a photographing mode in which the measuring distance point is selected using visual axis information (that is, the visual axis automatic focus photographing mode), thus enabling a photographer to choose arbitrarily either one of them by setting the visual prohibition mode or the other.

In this respect, there are conceivably several algorithms for the automatic selection of the measuring distance points, and it is effective to use a close point preference algorithm in which the central point of a distance measuring region is weighted. Here, however, this algorithm is not directly concerned with the present invention. Therefore, the description thereof will be omitted.

When the visual axis detection mode is set, the visual detection will be executed (#004). In this case, the LED driving circuit 106 turns on the illuminating LED (F-LED) 25; the LCD driving circuit 105 illuminates the visual axis input mark 78 of the LCD 24 in the finder; thus, outside the finder screen, the photographer is able to confirm at 207 (see FIG. 3) that the camera is in a state of carrying on the visual detection.

Here, the visual axis detected by the visual axis detection circuit 101 is transformed into the target point coordinates on the focusing plate 7. The CPU 100 selects the measuring distance points close to the forgoing target point coordinates, and transmits signals to the LED driving circuit 106, and then, blinks the foregoing distance measuring marks for display by use of the superimpose LED 21 (#005). The photographer looks at the display of the measuring distance points which have been selected in accordance with the photographer's visual axis. Here, if the photographer does not recognize that the measuring distance points thus displayed are correct, and releases his finger from depressing the release button 41 to turn off the switch SW1 (#006), the camera will be on standby until the switch SW1 is again turned on (#002).

In this way, with the blinking display of the measuring distance points in the finder field, the photographer is informed of the selection of the measuring distance points by the visual axis information. Thus, the photographer can confirm whether the measuring distance points have been selected as intended or not.

Also, if the photographer continues turning on the switch SW1 (#006) while looking at the display of the measuring distance points thus selected by the photographer's visual axis, the automatic focus detection circuit 103 executes the focal point detection at one or more measuring distance points (#007) using the detected visual axis information. Here, whether or not the selected measuring distance point is measurable is determined (#008). If not measurable, the CPU 100 transmits a signal to the LCD driving circuit 105 in order to blink the in-focus mark of the LCD 24 in the finder so that the photographer is warned of the NG (not good) of the measuring distance point (#018). This will continue until the SW1 is released (#019).

If the distance measurement is measurable, the CPU 100 transmits a signal to the lens focal point adjustment circuit 110 to drive the photographing lens 1 for a given amount (#017) if the focal point adjustment of the measuring distance point selected by a given algorithm is not in the in-focus state (#009). After the lens is driven, the automatic focal point detection circuit 103 executes the focal point detection again (#007) to see whether the photographing lens 1 is in the in-focus state or not (#009).

If the photographing lens 1 is in the in-focus state at the given measuring distance point, the CPU 100 transmits a signal to the LCD driving circuit 105 in order to illuminate the in-focus mark of the LCD 24 in the finder, and at the same time, to transmits a signal to the LED driving circuit 106 so that the in-focus indication is given to the focused measuring distance point 201 (#010).

At this juncture, the blinking indication of the measuring distance point selected by the foregoing visual axis is turned off. However, the measuring distance point in the in-focus indication often matches with the measuring distance point selected by the visual axis. Therefore, the focused distance point is set in the illuminated state for the purpose of enabling the photographer to confirm that the measuring distance point is in the in-focus state. The photographer looks at the focused measuring distance point thus indicated in the finder, but if he releases his finger from the release button 41 to turn off the switch 1 (#011) considering that the focused measuring distance point is still incorrect, the camera will then be on standby continuously until the switch SW1 is turned on (#002).

Also, when the photographer looks at the measuring distance point which is in the in-focus indication, and keeps the switch SW1 turning on (#011), the CPU 100 transmits a signal to the photometric circuit 102 for the execution of a photometry (#012). At this juncture, an exposure value of the weighted photometric areas 210 to 213 is calculated including the measuring distance point in-focus.

Then, it is determined whether or not the release button 41 is further depressed to turn on the switch SW2 (#013). If the switch SW2 is still in the OFF-state, the current state of the switch SW1 will be again examined for confirmation (#011). Here, if the switch SW2 is turned on, the CPU 100 transmits a signal to the shutter control circuit 108, motor control circuit 109, and diaphragm control circuit 111, respectively.

At first, the motor M2 is energized in order to raise the main mirror 2. Then, after the diaphragm 31 is stopped down, the magnet MG1 is charged to release the first blade of the shutter 4. The stop value of the diaphragm 31 and the shutter speed of the shutter 4 are determined by the exposure value detected by the photometric circuit 102 and the sensitivity of the film 5. After the elapse of a given shutter seconds (1/250 second, for example), the magnet MG2 is charged to close the second blade of the shutter 4. When the exposure to the film 5 is completed, the motor M2 is again energized to lower the mirror, and charge the shutter, and at the same time, to energize the motor M1 for the frame feeding of the film. Thus, a series of the shutter release sequential operations are terminated (#014). The camera will be on standby until the switch SW1 is again turned on (#002).

Figure 6:
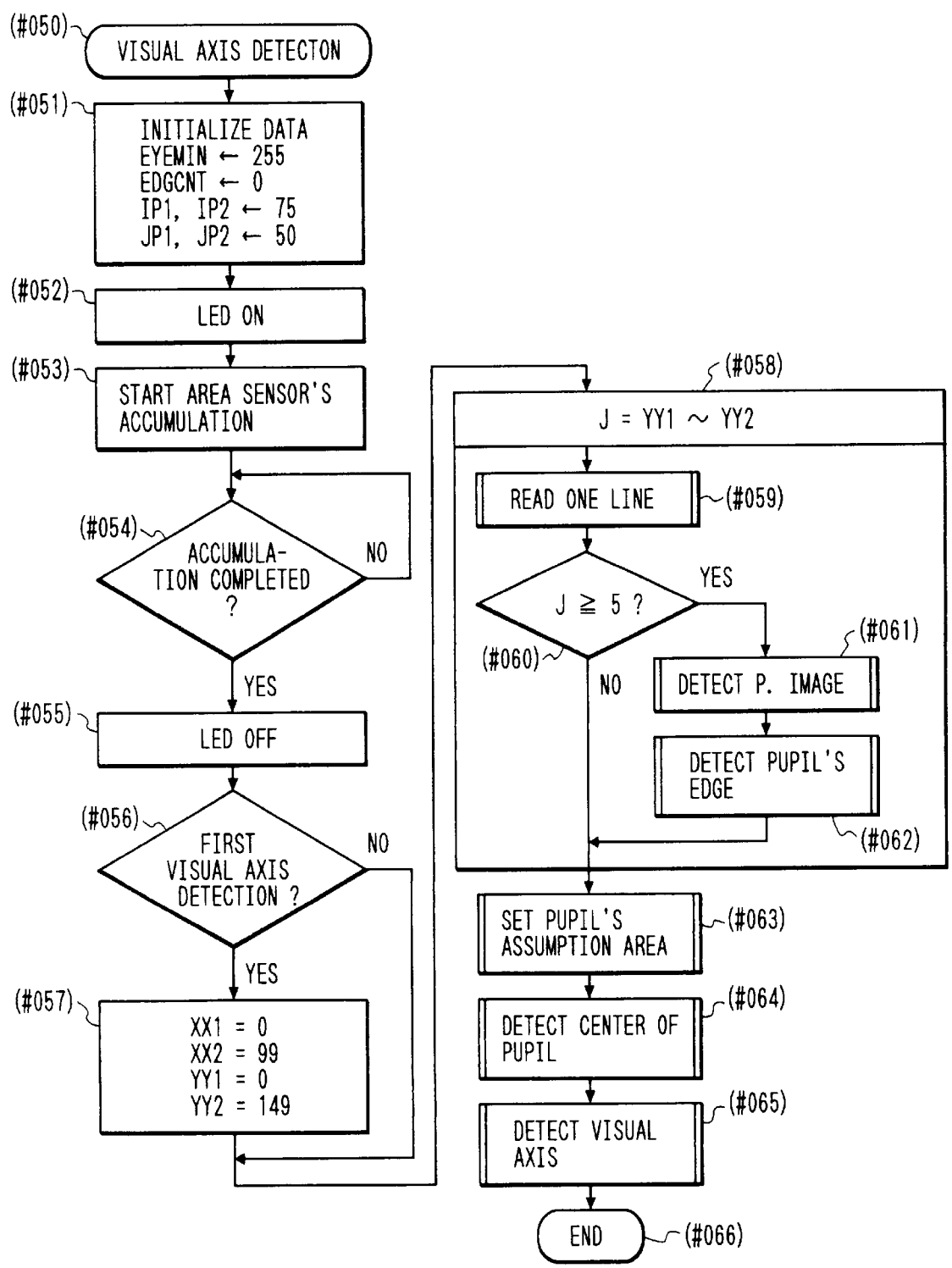
FIG. 6 is an entire flowchart showing the visual axis detecting operation in the flowcharts shown in FIGS. 5A and 5B.

FIG. 6 is a flowchart showing a visual axis detection.

In the foregoing flowchart shown in FIGS. 5A and 5B, the visual axis detection circuit 101 executes a visual axis detection when receiving a signal from the CPU 100 (#004).

When the visual axis detection starts, the initialization of data is executed in step (#051) through step (#050) in FIG. 6.

A variable EYEMIN is the variable with which to store the minimum luminance value in the photoelectric conversion signals of the eye ball reflection image. Assuming that the resolution of the A/D converter incorporated in the microcomputer (MCU 109) is eight bits, the minimum value is compared and updated one by one as the image signals are read. The stored initial value is 255 which represents the maximum value at eight bits.

A variable EDGCNT is the variable with which to count the extracted number of boundaries between the iris and pupil as edges.

Variables IP1, IP2, JP1, and JP2 are the variables representing the positions of the cornea reflection images (hereinafter referred to as Purkinje images: P images) of the light emitting diodes 13a and 13b. There are two P images in the area of the eye ball reflection image surrounded by the horizontal region (X axis) IP1 to IP2, and the vertical region (Y axis) JP1 to JP2.

Now, it is assumed that the size of the pixel numbers of the area sensor 7 is 150 in the horizontal direction and 100 in the vertical direction. To the variables IP1, IP2, JP1, and JP2, the positions (75 and 50) which are just center of the entire area are stored as initial values.

After the data initialization, the process will proceed to step (#052).

In the step (#052), the light emitting diodes 13a and 13b for the P images and light emitting diodes 13c and 13d for the eyeball illumination are turned on. In this respect, it may be possible to arrange the light emitting diodes 13a and 13b to dually function as the one for P image formation and the one for eyeball illumination. In the next step (#053), the accumulating operation of the area sensor 7 will be actuated. Since the sensor control is not directly concerned with the present invention, the detailed description will be omitted. However, it is assumed that in the embodiments according to the present invention, the sensor driving is controlled through the sensor interface circuit which is not shown.

In step (#054), the process will wait for the completion of the area sensor accumulation. When the given charge accumulation is completed, the light emitting diodes are turned off in the next step (#055).

Now, in the next step (#056), it is determined whether or not the visual axis detecting operation is a first control. If it is not the first control, the process will proceed to step (#058). If it is the first control, the process will proceed to step (#057) to initialize the variables which designate the reading regions of the area sensor, respectively.

XX1=O is the pixel at which to start reading the X axis.

XX2=149 is the pixel at which to terminate reading the X axis.

YY1=0 is the pixel at which to start reading the Y axis.

YY2=99 is the pixel at which to terminate reading the Y axis.

In the present embodiment, as the pixel number of the area sensor is 150×100, the initial values are set as above so that the entire pixels are read.

Now, in the next step (#058) and on, the reading of the photoelectric signals of the area sensor is started.

Step (#058) represents the so-called "loop processes", that is, to execute the process in a frame while the loop variable J is being counted up from the variable YY1 to the variable YY2.

Figure 7:
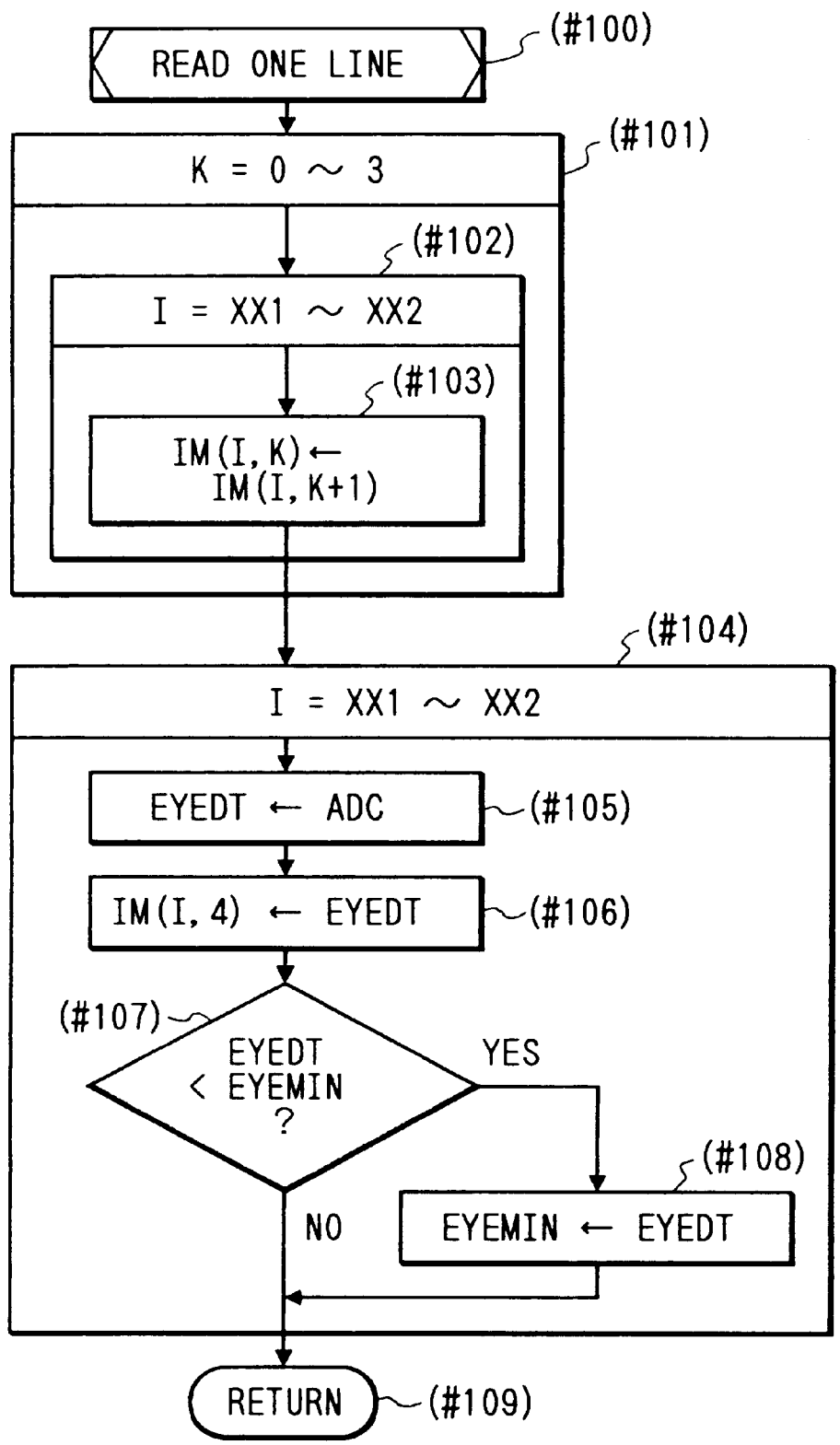
FIG. 7 is a flowchart showing the one-line reading operation in the flowcharts shown in FIGS. 5A and 5B.

In the loop processes in the step (#058), at first, photoelectric conversion signals are read for a one-line for the area sensor in the horizontal direction (X axis) in step (#059). The one-line reading is arranged in the form of a subroutine. FIG. 7 is a flowchart showing the "one-line reading" subroutine.

When the "one-line reading subroutine" is called, step (#100) in FIG. 7 is executed, and then, the next step (#101) will be executed. The step (#101) and step (#102) in its frame represent the same loop processes as these executed in the step (#058). While in the step (#101) a variable K is being counted up from 0 to 3, and in the step (#102) a variable I is being counted from XX1 to XX2, the processes in the respective frames are executed. Therefore, the step (#101) and step (#102) represent the so-called "nested" loop processes of the variable K and variable I.

In step (#103) in the loop processes in the step (#102), the restorage operation is executed for the array variable IM (i, k).

In the present embodiment, the microcomputer MCU109 executes the signal processing, but in general, the storage capacity of a RAM (random access memory) incorporated in a microcomputer is not large enough to store the entire pixel information of the area sensor at a time. Here, therefore, according to the present embodiment, while the image signals output from the area sensor are being read one after another, only the updated image signals which are equivalent to a five-line portion in the horizontal direction (X axis) are stored in the RAM incorporated in the microcomputer, and each time a one-line portion is read, the process for the visual axis detection is executed.

The content of the execution in the double loop processes in the step (#101) to step (#103) is an operation to update the image signal data for the past five-line portion in storage in order to read a new one-line portion of the image signals. In other words, among the array variable IM (i, k), the IM (i, 0) [i=variable XX1 to variable XX2] represents the oldest one-line image data, and also, IM (i, 4) [i=variable XX1 to variable XX2] represent the newest one-line image data. Therefore, as given below, the data are updated so that the preparation is made to store the new one-line portion of the image signals in the IM (i, 4) [i=variable XX1 to variable XX2].

IM (i, 0)←IM (i, 1)
IM (i, 1)←IM (i, 2)
IM (i, 2)←IM (i, 3)
IM (i, 3)←IM (i, 4) [i=variable XX1 to variable XX2]

Now, when the loop processes to update the data in the step (#101) to step (#103) are completed, the loop processes in the next step (#104) will be executed.

In the loop process in the step (#104), a one-line portion (designated pixels) of the image signals in the horizontal direction (X axis) of the area sensor is being A/D converted sequentially in order to store the signals in the RAM, and also, the minimum value of the image signals is detected.

In the initial step (#105) in the loop in the step (#104), the digital values ADC which are A/D converted image signals are fetched from the A/D converter incorporated in the microcomputer MCU109, and are temporarily stored in a variable EYEDT. Then, in the next step (#106), the values of the variable EYEDT are stored in the array variable IM (I, 4). The variable I is counted up from the variable XX1 to the variable XX2 in the outer loop processes in the step (#104).

Steps (#107) and (#108) are the processes to detect the minimum value of the image signals. A variable EYEMIN is the variable which holds the minimum value of the image signals. In the step (#107), if the variable EYEDT is smaller than the variable EYEMIN, the process will branch to the step (#108) to update the variable EYEMIN with the smaller value of the variable EYEDT.

When the loop processes in the steps (#104) to (#108) are completed to have stored the new one-line portion of the image signals, and to have detected the minimum value, the process will return from the "one-line reading" subroutine in the next step (#109).

Reverting to the flowchart shown in FIG. 6, when the "one-line reading" subroutine in the step (#059) is completed, the process will proceed to the next step (#060) to examine whether or not the loop variable J is 5 or more in the outer loop process step (#058).

The loop variable J represents the pixel line in the vertical direction (Y axis) of the area sensor. In step (#060), if the loop variable is five or more, the process will branch to step (#061). This is because the processes in the vertical direction (Y axis) of the area sensor can be executed when the read line numbers of the image signals become five or more.

In the step (#061) which is the destination of the branching, a subroutine "P image detection" will be executed.

Figure 8:
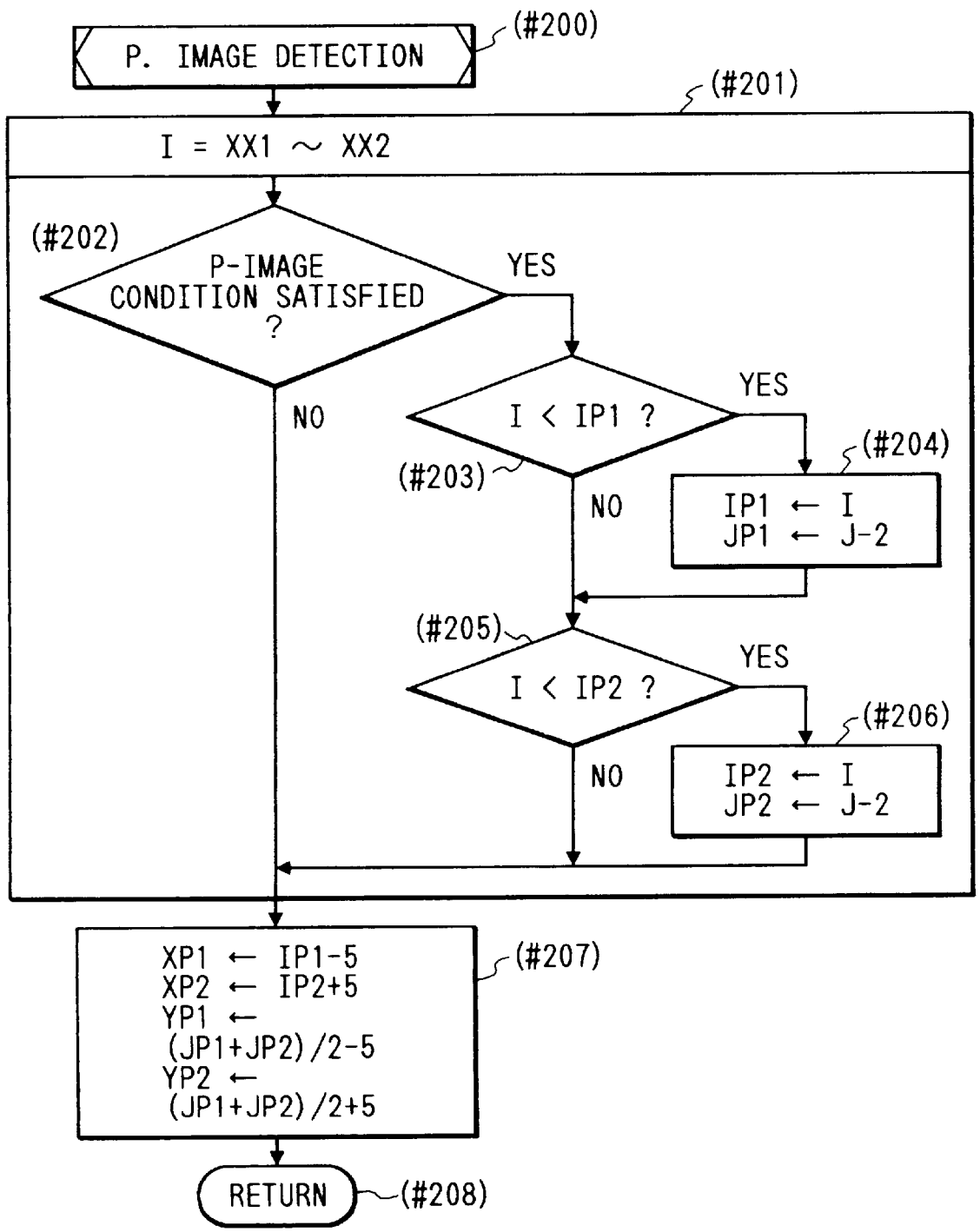
FIG. 8 is a flowchart showing the P image detecting operation in the flowcharts shown in FIGS. 5A and 5B.

The "P image detection" subroutine is the processes to detect the positions of the foregoing cornea reflection images (P images), and is executed per one-line reading in the horizontal direction (X axis) of the area sensor. FIG. 8 is a flowchart showing this subroutine.

When the "P image detection" subroutine is called, the loop processes in step (#201) will be executed through step (#200). In the loop processes, the positions of P images are searched in the image data (stored in the array variables IM (i, k)). If any found, the positions on the area sensor are stored. In the present embodiment, two P images are generated. The positional information which will be stored is also two.

In the initial step (#202) in the loop, it is determined whether or not the image data in given positions satisfy the conditions as P images. The conditions should be as follows:

The "P image conditions" in the step (#202)
IM (1, 2)>C1
and IM (I, 1)>C2
and IM (I, 3)>C2
and IM (I−1, 2)>C2
and IM (I+1, 2)>C2

However, the C1 and C2 are the threshold constants whose relationship is C1≧C2, and C1=230, C2=200, for example. Also, the variable I is the loop variable for the loop processes, which represents the horizontal position (X axis) of the area sensor.

The above-mentioned conditions are defined both in the horizontal and vertical directions (X and Y axes) with an attention given to the fact that the P images are like spot images as described in conjunction with FIGS. 1A and 1B. When these conditions are satisfied, it is assumed that the P images are present at the positions (1, 2).

As described above, the array variable IM (i, K) is updated each time a one-line portion in the horizontal direction (X axis) is read, and the line at position J in the vertical direction (Y axis) is stored in the variable IM (i, 4) [i=variable XX1 to XX2]. Therefore, the addresses (1, 2) for the variable IM become the positions (I, J−2) on the area sensor.

In step (#202), when any image data exist to satisfy the conditions of the P images, the process will branch to step (#203) and on. If not, the loop variable I on the outer side will be counted up.

The step (#203) and those to follow are the processes to determine the range of the area where the two P images are present (the range [IP1 to IP2] in the X axis and the range [JP1 to JP2] in the Y axis).

At first, in the step (#203), the variable I representing the position of the area sensor in the horizontal direction (X axis) is compared with the variable IP1. If I<IP1, the process will branch to step (#204). In other words, it is intended to rewrite the variable IP1 if the position of the variable I is in the left side further than the position IP1 of the P image in the left-hand side in the horizontal direction within the range of the area where the P images are present.

In the step (#204), the value of variable I is stored in the variable IP1. The position (J–2) in the vertical direction at that time is stored in the variable JP1.

In step (#205) and step (#206), it is determined whether or not the P image position IP2 in the right-hand side as well as the variable JP2 representing its position in the vertical direction are updated within the range of the area where the P images are present.

In the way as described above, the process will proceed to the next step (#207) when the one-line process in the position I in the horizontal direction (X axis) is completed from the variable XX1 to the variable XX2 in the loop processes in the step (#201).

In the step (#207), the variables XP1, XP2, YP1, and YP2, which will be referred to in the later processes, are calculated as shown by the equations shown in FIG. 8.

Figure 12:
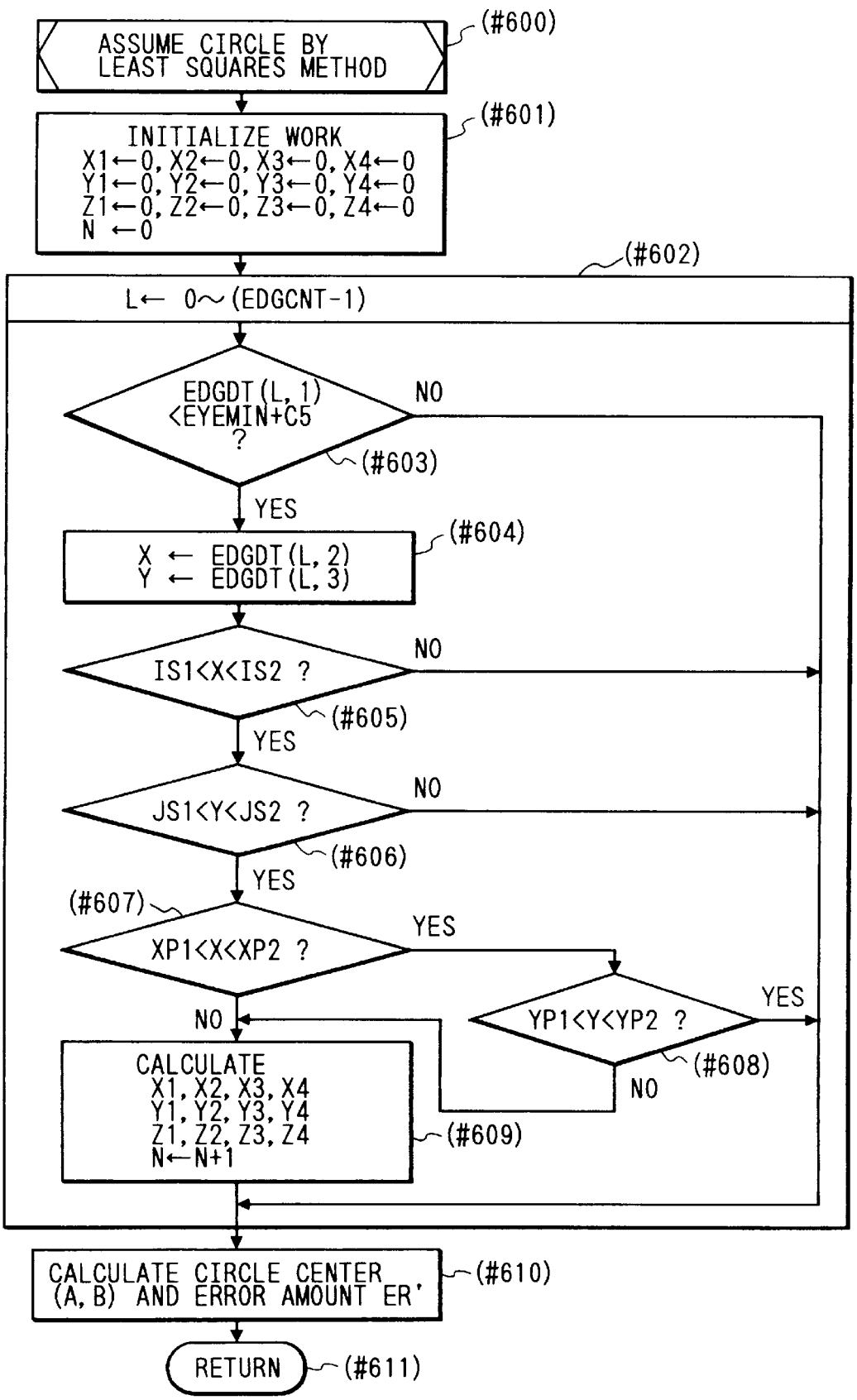
FIG. 12 is a flowchart showing the least square assuming operation for the circle shown in FIGS. 11A-1 and 11A-2.

The significance of these variables will be described in detail in conjunction with the description of FIG. 12, but to describe them briefly, these variables are used when excluding the information regarding the false edges of the pupil appearing in the circumference of the P image positions when the center of the pupil is detected.

Having executed the step (#207) completely, the process will return from the "P image detection" subroutine in the next step (#208).

Reverting again to the flowchart shown in FIG. 6, after the completion of the "P image detection" subroutine in the step (#061), the process will execute the "pupil's edge detection" subroutine in the next step (#062).

Figure 9:
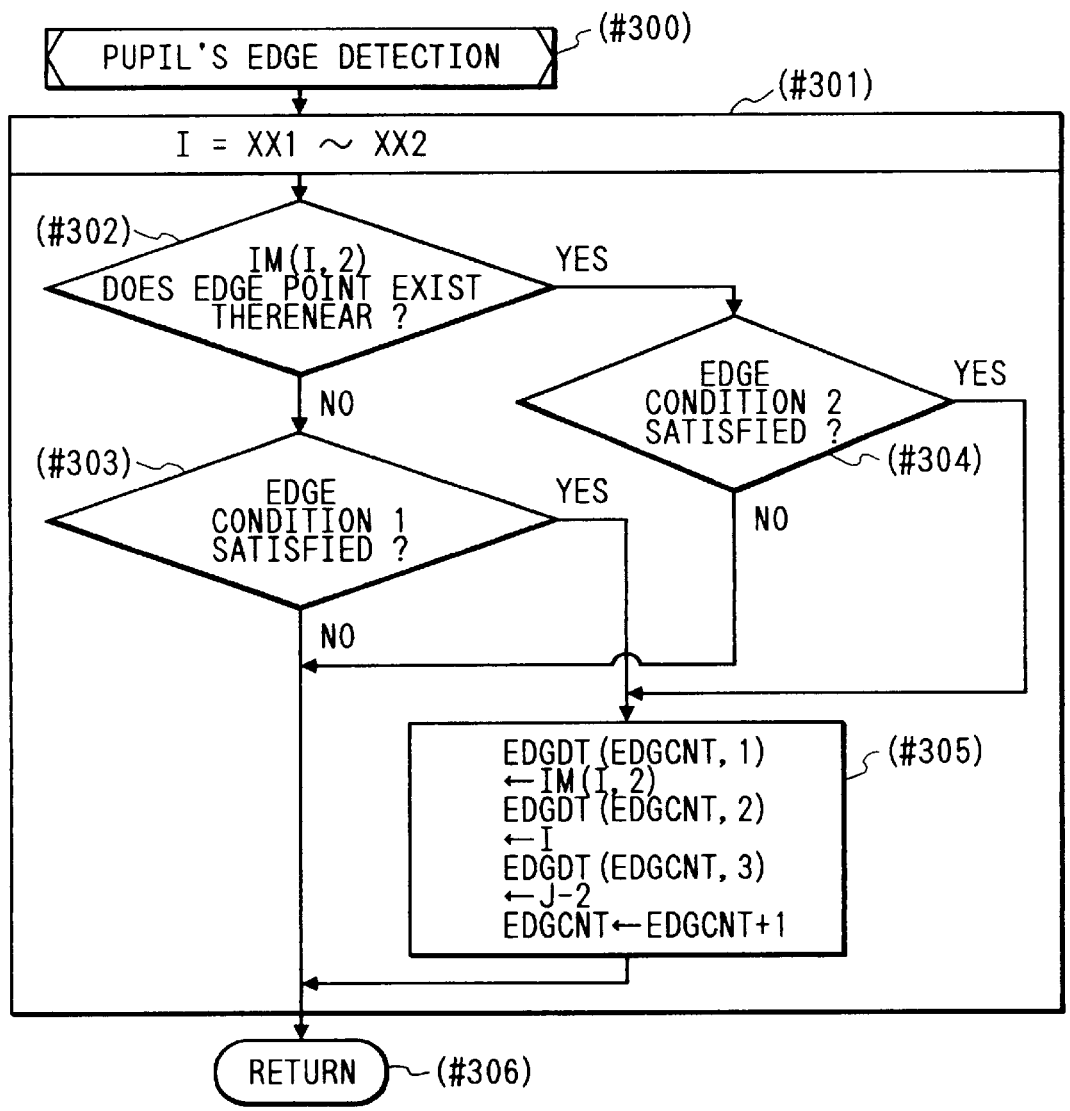
FIG. 9 is a flowchart showing the pupil's edge detecting operation in the flowcharts shown in FIGS. 5A and 5B.

The "pupil's edge detection" is a subroutine to detect the position of the pupil's edge (boundary between the iris and the pupil) in the eyeball reflection image. FIG. 9 is a flowchart showing this subroutine.

When the "pupil's edge detection" subroutine is called, the loop processes will be executed in step (#301) through step (#300). The step (#301) is the loop processes with the variable I which represents the position of the area sensor in the horizontal direction (X axis) in the same manner as in the step (#201) in FIG. 8.

In the loop processes in the step (#301), whether or not there are any characteristics which show the pupil's edge in the image data is searched. If affirmative, the positional information thereof is stored. The pupil's edge information is stored in the array variable EDGDT (m, n).

The data format of the array variable EDGDT (m, n) is defined as follows:

$EDGDT(m, 1)$ ... luminance at $m$th edge point $EDGDT(m, 2)$ ... X axis coordinates at $m$th edge point $EDGDT(m, 3)$ ... Y axis coordinates at $m$th edge point Here, the m is the order of edge points found in the processes of the sequential detection of the pupil's edge. Therefore, if the edges are detected in the number M, it is necessary to prepare the capacity of the array variable EDGDT for approximately [M×3] times. In the flowchart, the detected number of edges is counted by the variables EDGCNT.

Now, in the initial step (#302) in the loop, it is determined whether or not there is any edge point found in the past in the vicinity of the image data IM (I, 2). This is described more in detail as follows:

The loop variable I in the outer loop processes represents the position of the area sensor in the horizontal direction (X axis). The address (I, 2) for the array variables IM (i, k) which store the image data is just the point (the coordinates of the pixel) at which to detect whether it is the pupil's edge or not. Each of the points adjacent to this (I, 2) are those which should be examined in accordance with the array variables EDGDT (m, n) which store the positional information of the edges as to whether any one of such points has ever been determined as the pupil's edge in the process of the past sequential detection.

Here, to specifically describe, the determining conditions in the step (#302) will be as follows:

The "determining conditions" required for the step (#302)

{EDGDT (m, 2), EDGDT (m, 3)}={(I–1), (J–2)} or {(EDGDT (m, 2), EDGDT (M,3)}={(I–1), (J–3)} or {(EDGDT (m, 2), EDGDT (M,3)}={(I), (J–3)} or {(EDGDT (m, 2), EDGDT (M,3)}={(I+1), (J–3)} where m=0–(EDGCNT–1)

Now, since the coordinates which should be examined currently are {(I), (J–2)}, the above-mentioned coordinates represent the positions on the left-hand side, upper left-hand side, upper side, and upper right-hand side adjacent to the current coordinates in that order.

Also, the EDGDT (m, 2) and EDGDT (m, 3) represent the X axis coordinates and Y axis coordinates at mth edge points, respectively. Therefore, the above-mentioned conditions are those under which to determine whether or not there has been any edge point in the positions on the left-hand side, upper left-hand side, upper side, and upper right-hand side adjacent to the current coordinate eventually.

In the step (#302), if it is determined that there is an edge point in the vicinity of the coordinates (I, J–2), the process will proceed to step (#304). If not, the process will branch to step (#303), thus making the determination of the pupil's edge using the different conditions, respectively.

At first, the description will be made of a case where no edge point exists nearby.

In the step (#303), it is determined whether or not the image date at the coordinates (I, J–2) which should be examined currently satisfy the conditions of the pupil's edge (hereinafter the determining conditions in the step (#303) referred to as "edge conditions 1"). Here, the attention should be given to the fact that the image data at the coordinates (I, J–2) are stored in the array variable IM (I, 2).

The determining conditions will be as follows:

The "edge conditions 1" in the step (#303)

1. {I M (I–1, 2)–I M (1, 2)}>C3 and {I M (I–2, 2)–I M (I–1, 2)}<C3 and IM (I, 2)<a
2. {I M (I+1, 2)–I M (1, 2)}>C3 and {I M (I+2, 2)–I M (I+1, 2)}>C3 and I M (I, 2)<a
3. {I M (I, 1)–I M (1, 2)}>C3 and {I M (I, 0)–I M (I, 1)}>C3 and I M (I, 2)<a
4. {I M (I9, 3)–I M (I, 2)}>C3 and {I M (I, 4)–I M (I, 3)}>C3 and I M (I, 2)<a If the above-mentioned conditions 1 to 4 are satisfied, the coordinates (I, J–2) are regarded as the edge point. However, provided that a=EYEMIN+C4, the EYEMIN is the minimum luminance value in the image data in the sequential processes up to now.

The threshold values C3 and C4 are: C3=3, and C4=20, for example.

In the pupil's edge (boundary between iris and pupil), there is continuously difference in a given luminance in the above-mentioned conditions. At the same time, it is arranged characteristically that the pupil section has the minimum luminance in the eyeball reflection image. The conditions 1 and 2 are for the extraction of the edges in the area sensor in the horizontal direction (X axis), and the conditions 3 and 4 are for the extraction of the edges in the vertical direction (Y axis).

When the coordinates (I, J−2) are extracted as a pupil's edge point, the process will branch from the step (#303) to step (#305) to store the luminance value and coordinates of the edge point.

In the step (#305), the following information will be stored in the array variable EDGDT (m, k) for the storage of the edge position information:

EDGEDT (EDGDT, 1)←IM (I, 2)
EDGEDT (EDGDT, 2)←I
EDGEDT (EDGDT, 3)←J−2 where the IM (I, 2) is the edge point luminance detect at the EDGCNT number, and the I is its X coordinate, and the (J−2) is its Y coordinate.

Then, the variable EDGCNT which counts the numbers of the detected edge points will be incremented by one.

When the process in the step (#305) is completed, the loop variable I of the outer loop processes (representing the X axis coordinate in the horizontal direction) will be counted up, and in the flowchart, the step (#302) and on will be executed again.

Now, the description will be made of a case where it is determined that the edge point is present in the vicinity of the current coordinates (I, J−2).

In this case, the process will branch to step (#304), and as in the step (#303), it is determined whether or not the image data at the coordinate (I, J−2), which should be examined currently, satisfy the pupil's edge conditions (hereinafter the determining condition in the step (#304) referred to as "edge conditions 2").

Here, in a sense, the "edge conditions 2" are made easier than the "edge conditions 1". In the present embodiment, the conditions are the same as the conditional expressions which are thus modified as follows with the exception of the definition of the threshold values which are given as C3' and C4' in place of C3 and C4:

C3'=2, and C4'=30.

With the above definition, the ratio of the edge determination will become greater than the "edge conditions 1".

The reason why the two kinds of edge conditions are prepared is that fundamentally, the edge point is present in succession, and does not exist isolatedly, and that conceivably, if a certain point is an edge point, the probability is high that its vicinity is also the same edge points.

When an edge point is found by the "edge conditions 2" in the step (#304), the process will branch to step (#305) to store the coordinate information of such point.

In this way, the loop processes in the step (#301) will be executed until the loop variable I becomes the variable XX2. When the edge detection process for a one-line portion of the area sensor is completed in the horizontal direction (X axis), the process will proceed to step (#306) to return from the "pupil's edge detection" subroutine.

Reverting again to the description in conjunction with FIG. 6, when the "pupil's edge detection" subroutine in the step (#062) is completed, the loop variable J (representing the vertical direction of the area sensor, that is, the Y axis coordinates) for the outer loop processes in the step (#058) is counted up, and the processes in step (#059) and on will be executed until the loop variable Y becomes a variable YY2.

When the loop variable Y becomes the variable YY2 to complete reading the pixels designated by the area sensor as well as its related processes, the process will proceed from the step (#058) to the step (#063).

In the steps (#063) to (#065), the pupil's central coordinates and visual axis are detected from the P image position and pupil's edge information detected in the loop processes in the step (#058).

At first, the "pupil's assumption area setting" subroutine is called in the step (#063).

In the plural pupil's edge points detected by the "pupil's edge detection" subroutine in the step (#062), the false edge points generated by the various noises are also involved in addition to those edge points which represent the pupil's circle (a circle formed by the boundary between the iris and pupil).

Figure 10:
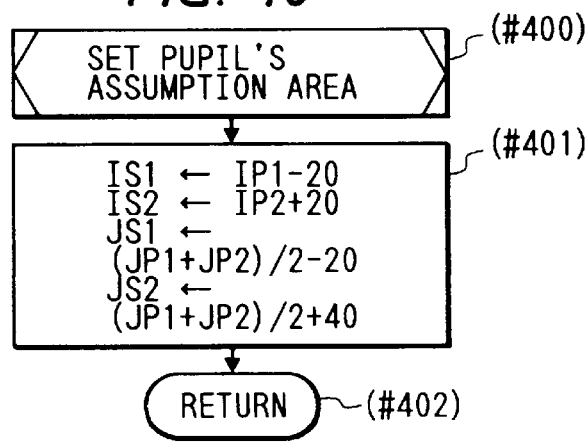
FIG. 10 is a flowchart showing the pupil's assumption area setting operation in the flowcharts shown in FIGS. 5A and 5B.

The "pupil's assumption area setting" is a subroutine to exclude the above-mentioned false edge points on the basis of the P image position information and to define the coordinate range of the most likely edge points. Its flowchart is shown in FIG. 10.

When the "pupil's assumption area setting" subroutine is called, the process will execute step (#401) through step (#400).

In the step (#401), the pupil's circle coordinate regions IS1, IS2, JS1, and JS2 are calculated by the following equations using the positional range of the P images described in the foregoing "P image detection" subroutine, that is, the information IP1 to IP2 in the horizontal direction (X axis) and JP1 to JP2 in the vertical direction (Y axis):

IS1←IP1−20
IS2←IP2+20
JS1←(JP1+JP2)/2−20
JS2←(JP1+JP2)/2+40

The most likely pupil's edge point is defined as the point which exists in the area IS1 to IS2 of the area sensor in the horizontal direction (X axis) and the area JS1 to JS2 in the vertical direction (Y axis).

In the optical system of the present embodiment, it is arranged that the two P images are always present on the upper part of the pupil's circle as shown in FIG. 1A. From this arrangement, the above-mentioned equations are established.

After the calculation in the step (#401), the process will proceed to step (#402) to return from the "pupil's assumption area setting" subroutine.

Reverting to FIG. 6, the "pupil's center detection" subroutine is called in the next step (#064).

Figure 11A:
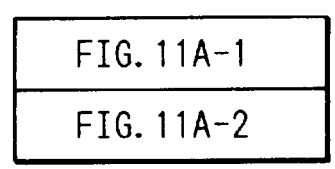
Figures 1, 11A:
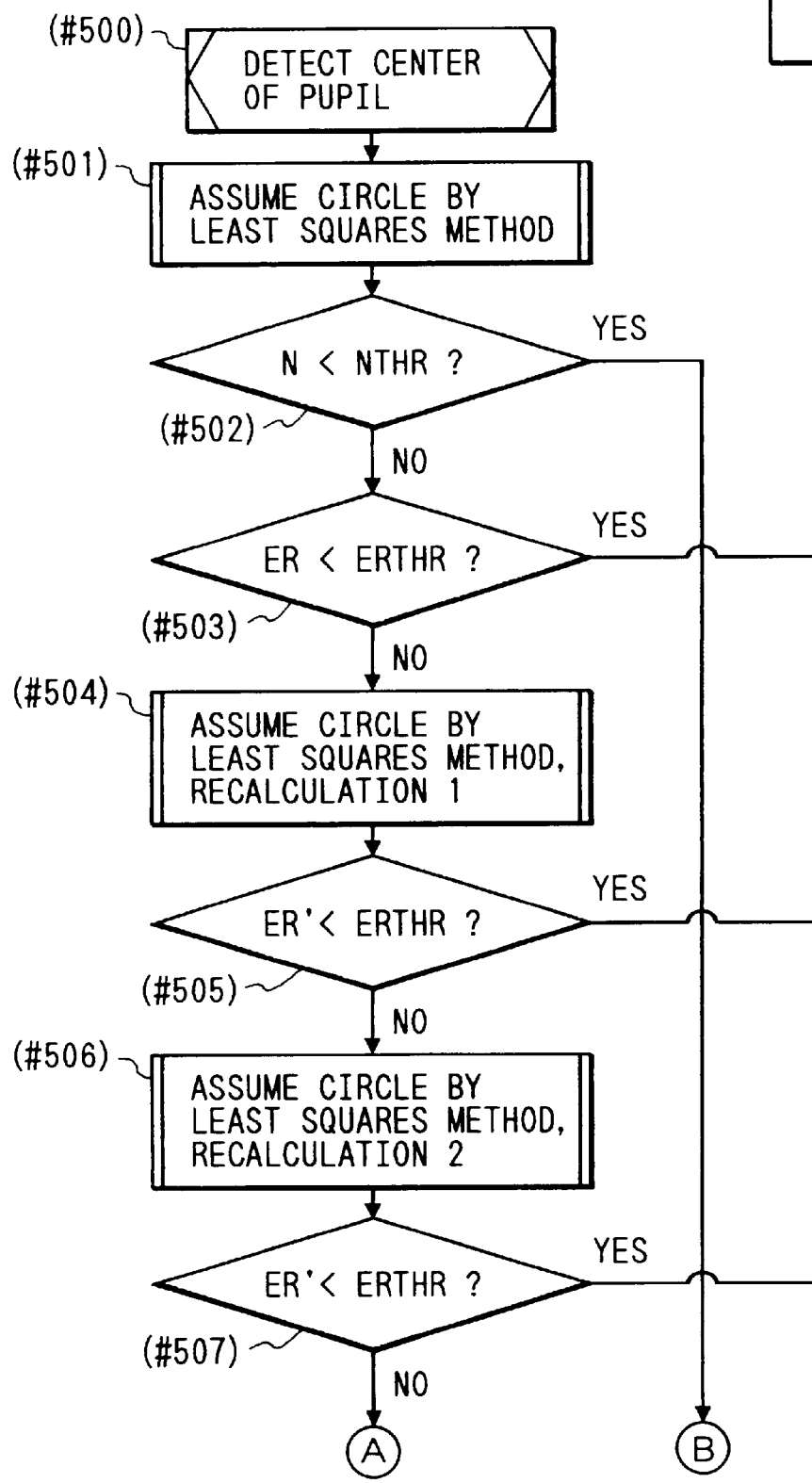
Figures 2, 11A:
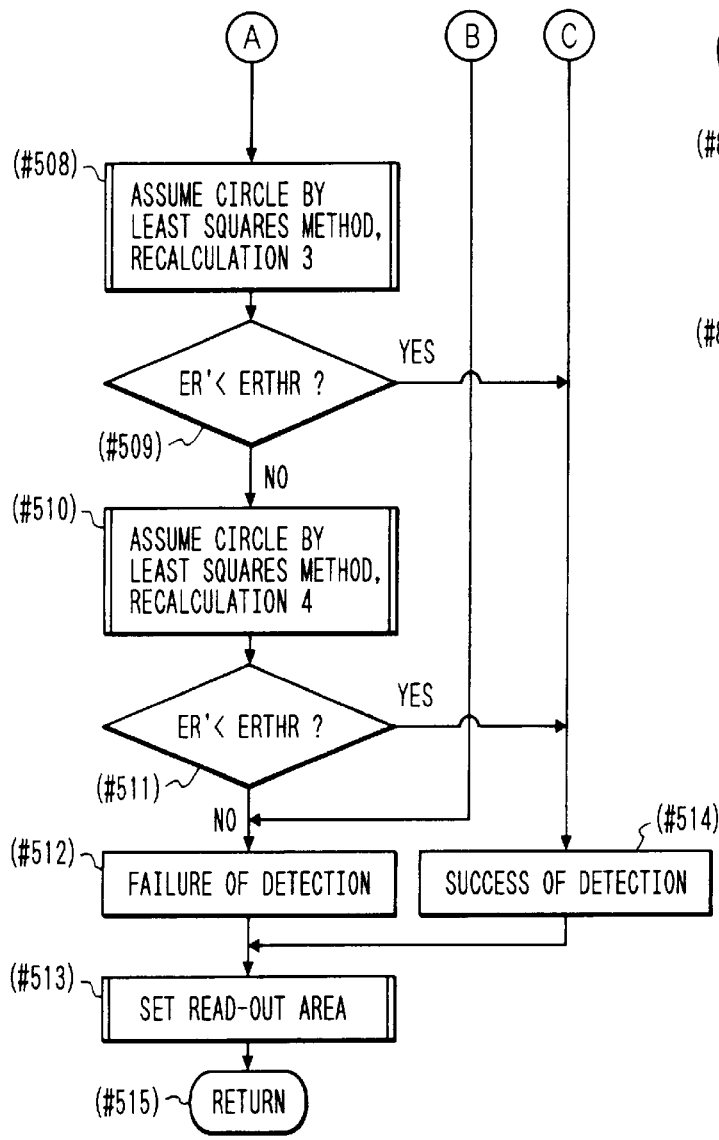

The "pupil's center detection" is a subroutine to estimate the configuration of the pupil's circle (the central coordinates and size) from the coordinates of the most likely pupil's edge point. Its flowchart is shown in FIGS. 11A-1 to 13B.

To estimate the configuration of the pupil's circle, the "least square method" is used. At first, the way of thinking of this will be described.

As well known, the formula of a circle sets its central coordinates as (a, b), and given its radius as c, the circle is provided as follows:

$$(x-a)^2+(y-b)^2=c^2 \qquad (10)$$

From a plurality of observing points (x1, y1), (x2, y2) . . . (nx, ny), the a, b, and c are conceivably determined so that the error amount ER in the following equation can be minimized:

$$ER=\Sigma[(xi-a)^2+(yi-b)^2-c^2]^2 \qquad (11)$$

where the ER is the square sum of the distance (error) in the normal direction of the circle determined by each of the observing points and the a, b, and c. This is defined as the minimum.

The ER is partially differentiated by each of the a, b, and c, and is defined as zero.

$$\delta ER/\delta a = \sum [-4(xi-a)^3 - 4(xi-a)(yi-b)^2 + 4c^2(xi-a)] \quad (12)$$
$$= 0$$

$$\delta ER/\delta b = \sum [-4(yi-b)^3 - 4(xi-a)^2(yi-b) + 4c^2(xi-b)] \quad (13)$$
$$= 0$$

$$\delta ER/\delta c = \sum [4c^3 - 4(yi-b)^2 c - 4c(xi-a)^2] \quad (14)$$
$$= 0$$

where i=1 to n.
From the equation (14):

$$c^2 \Sigma[(xi-a)^2 + (yi-b)^2]/n \quad (15)$$

The equation (15) is assigned to equations (13) and (14). Here, $$X1 = \Sigma xi, X2 = \Sigma xi^2, X3 = \Sigma xi^3 \quad (16) \text{ to } (18)$$

$$Y1 = \Sigma yi, Y2 = \Sigma yi^2, Y3 = \Sigma yi^3 \quad (19) \text{ to } (21)$$

$$Z1 = \Sigma xiyi, Z2 = \Sigma xi^2 yi, Z3 = \Sigma xiyi^2 \quad (22) \text{ to } (24)$$

Further, $$V1 = X2 - X1^2/n \quad (25)$$
$$V2 = Y2 - Y2/n \quad (26)$$
$$W1 = X3 - Z3 \quad (27)$$
$$W2 = Y3 - Z3 \quad (28)$$
$$W3 = (X2 + Y2)/n \quad (29)$$
$$W4 = Z1 - X1Y1/n \quad (30)$$
$$W5 = (Z1 - 2 \cdot X1Y1/n)Z1 \quad (31)$$
$$W6 = X1Y2 \quad (32)$$
$$W7 = X2Y1 \quad (33)$$

To arrange these, the central coordinates of the circle a and b are calculated as follows:

$$a = (W1V2 - W2W4 - (W6 - Y1Z1)W3)/2(X2V2 - W5 - W6X1/n) \quad (34)$$

$$b = (W2V1 - W1W4 - (W7Y1Z1)W3)/2(Y2V1 - W5 - W7Y1/n) \quad (35)$$

Here, although not directly related to the calculation of the visual axis (target point), the radius c is calculated as follows:

$$c = [W3 - 2(aX1 + bY1)/n + a^2 + b^2]^{1/2} \quad (36)$$

In the present embodiment, the error amount ER is further used for the determination of the reliability of the pupil's center detection. The ER will be given by the following equation:

$$ER = X4 - 4aX3 + 2(2a^2 + d)X2 - 4adX1 + Y4 - 4bY3 + \quad (37)$$
$$2(2b^2 + d)Y2 - 4bdY1 + 2(Z4 - 2aZ3 - 2bZ2 + 4abZ1) + d^2n$$

However, $$X4 = \Sigma xi^4 \quad (38)$$

$$X4 = \Sigma yi^4 \quad (39)$$

$$Z4 = \Sigma xi^2 yi^2 \quad (40)$$

$$d = a^2 + b^2 - c^2 \quad (41)$$

Now, with the support of the numeral operations mentioned above, the description will be made of the flowcharts shown in FIG. 11A-1 to FIG. 13D.

When the "pupil's center detection" subroutine is called, the "least square circle assumption" subroutine is called in step (#501) through step (#500).

The "least square circle assumption" subroutine is to calculate the central coordinates (a, b) of the pupil's circle and the error ER. FIG. 12 is a flowchart of this subroutine. In the subroutine, the reexamination of the minimum luminance value and the exclusion of the false pupil's edges due to the P images are also executed.

When the "least square circle assumption" subroutine is called, the process will proceed to step (#601) through step (#600).

In the step (#601), the work variables for the above-mentioned least square assumption equations are initialized.

The next step (#602) is the loop processes with the variable L as its loop variable, which will execute the front half of the least square calculation on the basis of the stored pupil's edge information.

Now, the numbers (EDGCNT-1) of information are stored in the array variable EDGDT as the pupil's edge points. The loop variable L represents the order in which these numbers of information are stored.

In the first step (#603) in the loop processes, the luminance value EDGDT (L, 1) at the Lth edge point is compared with the (EYEMIN+C5), and if the luminance value is greater, the process will branch, and complete the current processes of the loop variable L.

In the present embodiment, while reading the photoelectric signals of the area sensor, the processes are sequentially executed. Therefore, the minimum luminance used in the part where the edge point is detected should merely be the minimum luminance value up to that time only. Hence, the point which has been detected as an edge point is essentially only a minimum luminance value. Consequently, the point which has been detected as an edge point is not determined by the true minimum luminance value. Thus, there is a possibility that some point which is not appropriate as an edge point is also involved. It is, therefore, an objective of this step to exclude any point which is not appropriately regarded as the pupil's edge by reexamining the minimum luminance value of the detected points on the basis of the value of the minimum luminance finally defined.

Here, the threshold value C5 is: C5=20, for example.

In the step (#603), if it is determined that the luminance value is small, the process will proceed to step (#604) to temporarily store the coordinates in the horizontal direction (X axis) and in the vertical direction (Y axis) in the respective variables X and Y.

In the next step (#605), it is determined whether or not the coordinates X in the horizontal direction at an Lth edge point fit in the area IS1 to IS2 in the horizontal direction. The IS1 and IS2 are the values obtained in the "pupil's assumption area setting" subroutine. The process will branch if the edge point is out of this area, and then, terminate the processes for the current loop variable L because such a point is not recognizable as the edge point.

In the next step (#606), the determining process is executed in the same manner in the vertical direction this time.

If the Lth edge point is in the pupil's assumption area, the process will proceed to step (#607).

In the steps (#607) and (#608), it is determined whether or not the Lth edge point is in the vicinity of the P images (Purkinge images).

The XP1, XP2, YP1, and YP2 are the values which are determined in the "P image detection" subroutine. The process will branch if the coordinates of the edge point are within the area of XP1 to XP2 in the horizontal direction and that of YP1 to YP2 in the vertical direction, and then, terminate the process for the current variable L. This is because, in the optical system in the present embodiment, the two P images are arranged to be present in the upper part of the pupil's circle, and the "foot" portion of the spot like P image easily fits the foregoing conditions of the pupil's edge, and thus, tends to have been detected as a pupil's false edge: this must be avoided.

The coordinate information of the edge point which has passed the determining processes in the steps (#603) to (#608) is provided for the least square calculation in step (#609).

In the step (#609), the foregoing equations (16) to (24) and (38) to (40) are operated, and, further, the number N of the edge points used for the operation will be counted up.

In the loop processes in the step (#602), when all the executions for the stored numbers of the edge points (EDGCNT−1) are completed, the process will proceed to step (#610).

In the step (#610), the equations (25) to (35) and (37) to (41) are operated to obtain the central coordinates (a, b) of the pupil's circle as well as the error amount ER.

Then, proceeding to the next step (#611), the process will return from the "least square circle assumption".

Figure 11B:
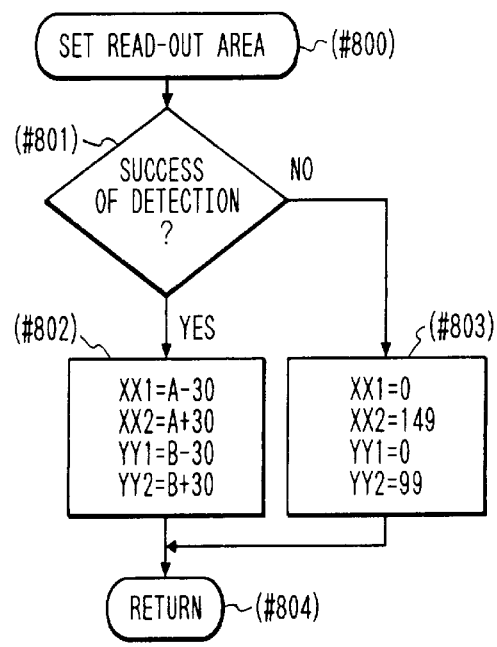

Reverting to FIGS. 11A-1 to 11B, when the "least square circle assumption" subroutine is completed in step (#501), the process will proceed to the next step (#502).

In the step (#502), the data numbers N used for the circle assumption is compared with the threshold value NTHR, and if N<NTHR, it is interpreted that the reliability of the result is low because the data numbers are small. Thus, the process will branch to step (#512) to define the detection as a failure.

As the NTHR, NTHR=30, for example.

In the step (#502), if N≧NTHR, the error amount ER and the threshold value ERTHR are compared in the next step (#503).

If ER<ERTHR, the error is small, and it is interpreted that the detection result is sufficiently reliable. Thus, the process will branch to step (#514) to make the detection a success.

As the threshold value ERTHR, ERTHR=10000, for example.

Figure 17:
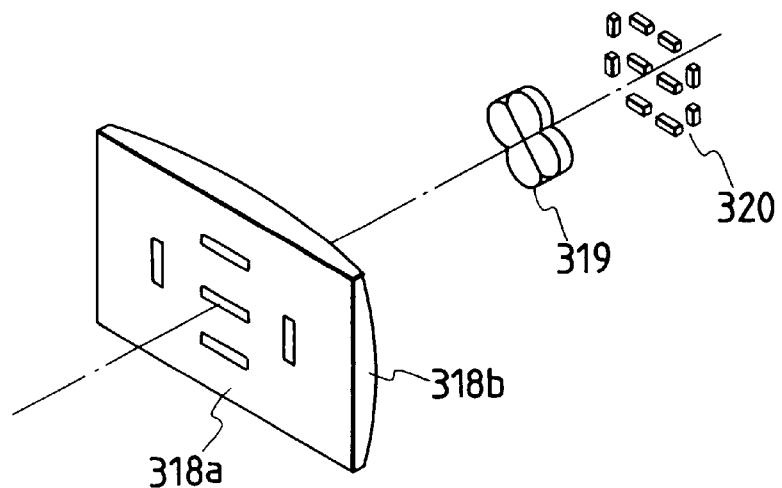
FIG. 17 is a perspective view showing a focal point detection apparatus.

In the step (#503), if ER≧ERTHR, it is interpreted that despite the data number is sufficient, the error is too large. Then, the recalculations in step (#504) and on will be executed. Conceivably, some of the false edge points other than the pupil's circle have been taken in the calculation, which may have brought about the large error. An example for such a process is shown in FIG. 17. In FIG. 17, a reference numeral 301 designates an extracted edge point; 302, the edge area to be used for the calculation; and 303, an estimated circle obtained by the calculation. In this case, a false edge point on the left-hand side is added to the calculation. As a result, the estimated circle shows a configuration which is far from being a correct circle. The error amount at that time is also becomes great. Therefore, the edge points at the coordinates on the ends in the vertical and horizontal directions are excluded from the calculations for the coordinates of each edge point in order to examine whether or not the error will become small step by step.

In step (#504), the subroutine "least square circle assumption-recalculation 1" is called.

The "least square circle assumption-recalculation 1" is the subroutine to remove the edge points in the upper part of the area sensor in the vertical direction (⅕ of the total) among the edge points used for the least square assumption calculation. Its flowchart is shown in FIG. 13A.

When the subroutine "least square circle assumption-recalculation 1" is called, the process will store variables in the step (#701) next to the step (#700) as shown in FIG. 13A.

The variables XS1 to ZS4 store the values of work variables corresponding to all the edge points used for the calculation in the step (#501). Then, the numbers of the edge points to be removed are arranged to be ⅕ of the numbers N representing the total number of the edge points, which will be stored in the variable M.

In the next step (#702), the work initialization is executed for the intended operation in the same manner as the step (#601). Then, the process will proceed to step (#703).

The step (#703) is the loop processes which are the same as the step (#602). In this loop, the least square method is operated for the edge points which should be removed.

In the present embodiment, the structure is arranged so that the area sensor is read from the top in the vertical direction. Therefore, in the array variable EDGDT (m, k) which stores the edge information, the edges are sequentially stored from the top in the vertical direction. Consequently, by counting up the m of the EDGDT (m, k) from zero, it is possible to fetch the edge points from the top in the vertical direction.

Now, in the initial step (#704) in the loop in step (#703), it is determined whether or not the edge point (Y, X) is effective as the pupil's edge. Here, the processes are exactly the same as those in the steps (#603) to (#608).

If the point is regarded as the pupil's edge point, the process will proceed to step (#705) to execute the same calculation as in the step (#609).

Then, in the next step (#706), the number N of the edge points which have been newly calculated is compared with the number M of the edge points which must be removed. When the operation of the M numbers is completed, the process will branch and suspend the outer loop processes in the step (#703). If the M numbers are yet to be reached, the process will continue counting up the loop variable L and again proceeding to the step (#704).

When the points of the M numbers are all calculated, the process will branch to step (#708) to recalculate the center of the pupil's circle (a, b) and the error amount ER'. The recalculation equations are as follows:

$$X1 = X1S - X1 \tag{16'}$$

$$X2 = X2S - X2 \tag{17'}$$

$$X3 = X3S - X3 \tag{18'}$$

$$Y1 = Y1S - Y1 \tag{19'}$$

$$Y2 = Y2S - Y2 \tag{20'}$$

$$Y3 = Y3S - Y3 \tag{21'}$$

$$Z1 = Z1S - Z1 \tag{22'}$$

$$Z2 = Z2S - Z2 \tag{23'}$$

$$Z3 = Z3S - Z3 \tag{24'}$$

$$X4 = X4S - X4 \tag{38'}$$

$$Y4 = Y4S - Y4 \quad (39')$$

$$Z4 = Z4S - Z4 \quad (40')$$

Then, by executing recalculations in accordance with the equations (25) to (35) and (37) to (41), it is possible to obtain the new pupil's center (a, b) and the error amount ER'. Essentially, as the equations (16) to (40) are of a sequential type, there is no need for recalculating the entire data. It will suffice if only the addition (or radical addition) of the area to be removed is operated, and then, the original value is subtracted by the result of such addition.

After the completion of the recalculations, the process will proceed to step (#709) and return from the subroutine "least square circle assumption–recalculation 1".

Reverting to FIGS. 11A-1 and 11A-2, when the step (#504) is completed, the process will proceed to step (#505) to compare the recalculated error amount ER' with the threshold value ERTHR. If the ER' is smaller, it is interpreted that the removal operation has been effective. The process will branch to step (#514) to make the detection a success.

If the error amount ER' is still larger, the process will proceed to step (#506) to call another subroutine "least square circle assumption–recalculation 2".

The "least square circle assumption–recalculation 2" is the subroutine to remove the edge points (⅕ of the total) which are present in the lower part of the area sensor in the vertical direction among the edge points used for the calculation of the least square assumption, and recalculate the least square assumption. Its flowchart is shown in FIG. 13B.

The "recalculation 2" is almost the same as the "recalculation 1", but in order to remove the edge points from the one in the bottom in the vertical direction unlike the "recalculation 1", the loop variable L is counted down from the (EDGCNT–1) in step (#712). All the other aspects are exactly the same as the "recalculation 1". Therefore, the description will be omitted.

Now, reverting to FIGS. 11A-1 and 11A-2, the description will continue.

When the subroutine "least square circle assumption–recalculation 2" is completed in step (#506), the process will proceed to step (#507) to compare the recalculated error amount ER' with the threshold value ERTHR. If the ER' is smaller, it is interpreted that the removal operation has been successful. The process will branch to step (#514) to make the detection a success.

If the error amount ER' is still large, the process will proceed to step (#508) to call still another subroutine "least square circle assumption–recalculation 3".

The "least square circle assumption–recalculation 3" is the subroutine in which the edge points (⅕ of the total) which are present in the left-hand portion in the area sensor in the horizontal direction are removed among the edge points used for the calculation of the least square assumption, and the least square assumption is again calculated. Its flowchart is shown in FIG. 13C.

When the subroutine "recalculation 3" is called, the array variable EDGDT (m, k) which stores the edge information is rearranged in step (#721) through step (#720).

As described earlier, the edge points are stored in the EDGDT (m, k) sequentially from the one in the area sensor in the vertical direction. Therefore, it is necessary to rearrange the data stored in the EDGDT when processed with the attention being given in the horizontal direction.

Since the value of the edge point in the horizontal direction (X axis coordinates) is stored in the EDGDT (m, 2), the known "sort operation" is carried out for this value.

Then, it is possible to restore the edge information in the EDGDT in order from the left-hand side in the horizontal direction.

After the completion of the rearrangement, the process will branch to step (#702). Subsequently, if only the processes are executed exactly in the same manner as the "recalculation 1", it is possible to operate the recalculation with the removal of the edge points on the left- and right-hand sides in the area sensor in the horizontal direction.

Again, reverting to FIGS. 11A-1 and 11A-2, when the subroutine "least square circle assumption–recalculation 3" is completed, the process will proceed to step (#509) to compare the recalculated error amount ER' with the threshold value ERTHR. If the ER' is smaller, it is interpreted that the removal operation has been effective. The process will branch to step (#514) to make the detection a success.

If the error amount ER' is still large, the process will proceed to step (#510) to call a further subroutine "least square circle assumption –recalculation 4".

The "least square circle assumption–recalculation 4" is the subroutine in which the edge points (⅕ of the total) which are present in the right-hand portion in the area sensor in the horizontal direction are removed among the edge points used for the calculation of the least square assumption, and the least square assumption is again calculated. Its flowchart is shown in FIG. 13D.

Now, in the array variable EDGDT (m, k), the edge points are stored sequentially from the left-hand side in the horizontal direction. Therefore, if the edge points are to be removed sequentially from the left-hand side, the EDGDT (m, k) should only be treated in the same manner as in the "recalculation 2". It is arranged, therefore, that as soon as the subroutine "recalculation 4" has been called, the process branches to step (#711) for the execution of the required processes in the same manner as the "recalculation 2".

Again, reverting to FIGS. 11A-1 and 11A-2, the description will continue.

When the subroutine "least square circle assumption–recalculation 4" is completed, the process will proceed to step (#511) to compare the recalculated error amount ER' with the threshold value ERTHR. If the ER' is smaller, it is interpreted that the removal operation has been effective. The process will branch to step (#514) to make the detection a success.

If the error amount ER' is still large, the process will proceed to step (#512), and then, interpreting that the above-mentioned operation has not been effectively carried out, the process will proceed to step (#512) to indicate the failure of the detection.

When the pupil's center detection is finally made in either in the step (#512) or in the step (#514), the step will proceed to step (#513).

In the step (#513), the subroutine "read-out area setting" is executed. FIG. 11B is a flowchart showing the "read-out area setting" subroutine. When the "read-out area setting" subroutine is called, the read-out area setting operations will be executed in step (#801) and on through step (#800).

At first, in the step (#800), whether the visual axis detection is a success or a failure is determined. If it is a success, the process will proceed to step (#802); if a failure, to step (#803).

In the step (#802), as the read-out area for the next execution of the visual axis detection, an area is set by expanding it by 30 pixels each in the vertical direction and horizontal direction with the coordinates in the center (a, b) of the pupil's circle obtained in the foregoing step (#610) as the center of these expansions.

Hence, in the next visual axis detecting operation, it is possible to read only the minimum image signals required, and then, to shorten the reading time. In the step (#803), the read-out area of the image sensor is modified to cover the total area, that is, to initialize the sensor.

This is a countermeasure in a case that the detection may fail due to the way the photographer looks in the finder, which should change abruptly by some reason, for example. In such a case, the read-out area of the image sensor must be rearranged to cover the total area.

Then, in step (#804), when returning from the "read-out area setting" subroutine, the process will proceed to step (#515). In the step (#515), the process will return from the subroutine "pupil's center detection".

Figure 14:
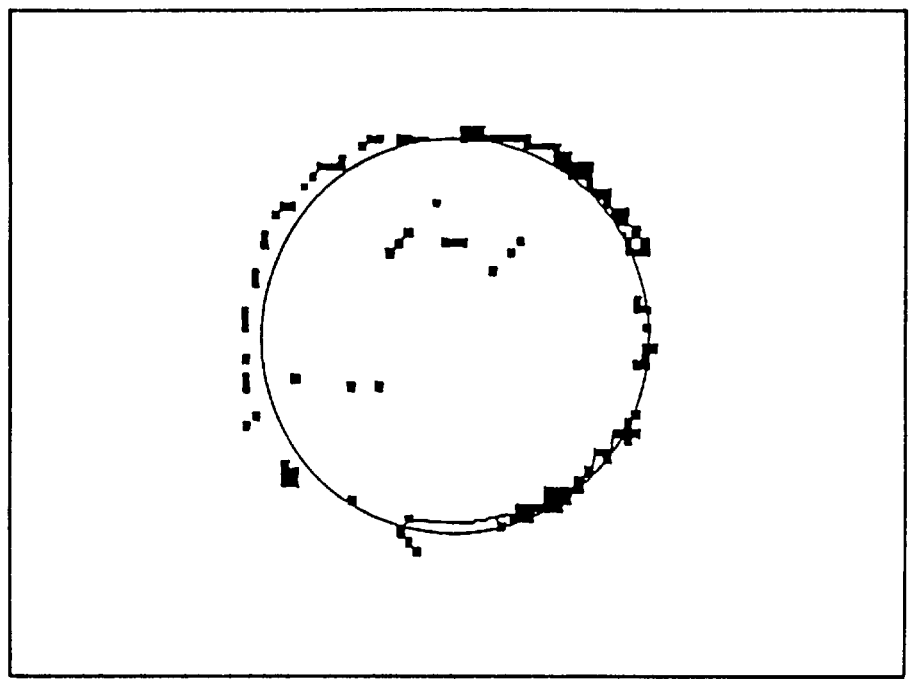
FIG. 14 is a view showing an example of the least square method.

FIG. 14 is a view introducing an example of the least square method according to the present invention.

The mark in FIG. 14 shows each one of the edge points. On the basis of these edge points, the pupil's circle is assumed.

Now, reverting to the description in conjunction with FIG. 6, when the "pupil's center detection" is completed in step (#064), the process will proceed to step (#065) to call the "visual axis detection" subroutine.

The "visual axis detection" subroutine is to detect the visual axis (target point) on the basis of the P image position and the central position of the pupil's circle which have been detected by the processes up to now.

Fundamentally, in the same way as the known example described earlier, it will suffice if only the rotational angle θ of the optical axis of the eye ball is calculated in accordance with the equation (2).

In the present embodiment, the pupil's center is detected two-dimensionally in the horizontal direction (X axis) and vertical direction (Y axis). Therefore, it is possible not only to detect the center in the horizontal direction as in the known example, but also to detect the direction of the visual axis in the vertical direction in the same concept as applicable to the detection in the horizontal direction.

When the visual axis detection is completed, the process will proceed to step (#066) to terminate this series of processes.

In the embodiment which has been described so far, there is set an area having the portion covering the vertical and horizontal pixel numbers from the center of the pupil's circle as the next read-out area, but it may be equally effective to obtain the radius of the pupil's circle by the application of the foregoing equation (36) and set a square or rectangular area having the length n times the obtained radius (n=a real number) as the next read-out area.

As described above, in operating the visual axis detection, the control means is provided for controlling the read-out area of light receiving means which receives the eyeball image when applying this visual axis detection unit to a camera having a servo AF function, hence making it possible to implement a visual axis detection apparatus capable of outputting the visual axis information having an excellent response with which to function the automatic focus while operating the visual axis detection in an extremely short processing time of the visual axis detecting operation without lowering the response when it is required to carry on a repeated operation of the visual axis detection at certain intervals at the time servo AF.

According to the embodiment described above, in the initial operation of the visual axis detection, the signals are read over the entire effective area of the image sensor, but there is a case where an eye cup is provided at the rear end of the finder of a camera, and when the photographer looks in the finder sensing the presence of such an eye cup, the center of his eye and the center of the finder field agree with each other automatically, or a case where the probability that the visual axis of the observer will move significantly is not high due to the appropriate arrangement of the indication patterns or the like appearing in the finder. In these cases, among some others, it is possible to anticipate the area for the necessary visual axis detection in which the characteristic points should appear. In such cases, there is a possiblity that the time required for processing the signals which have been read out over the effective area of the image sensor is shortened.

The embodiment given below is to implement the reduction of such period of processing time.

Figure 16:
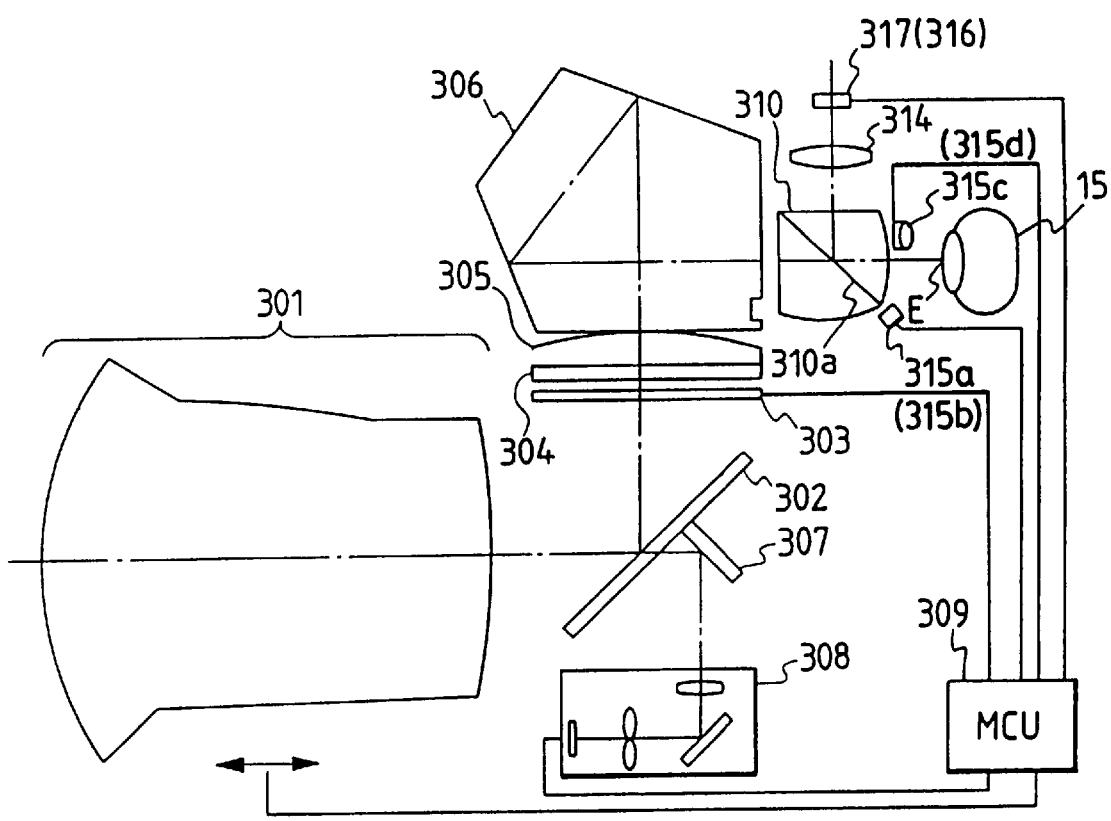
FIG. 16 is an optical cross-section of a single-lens reflex camera which suits the implementation of the present invention.
Figure 18:
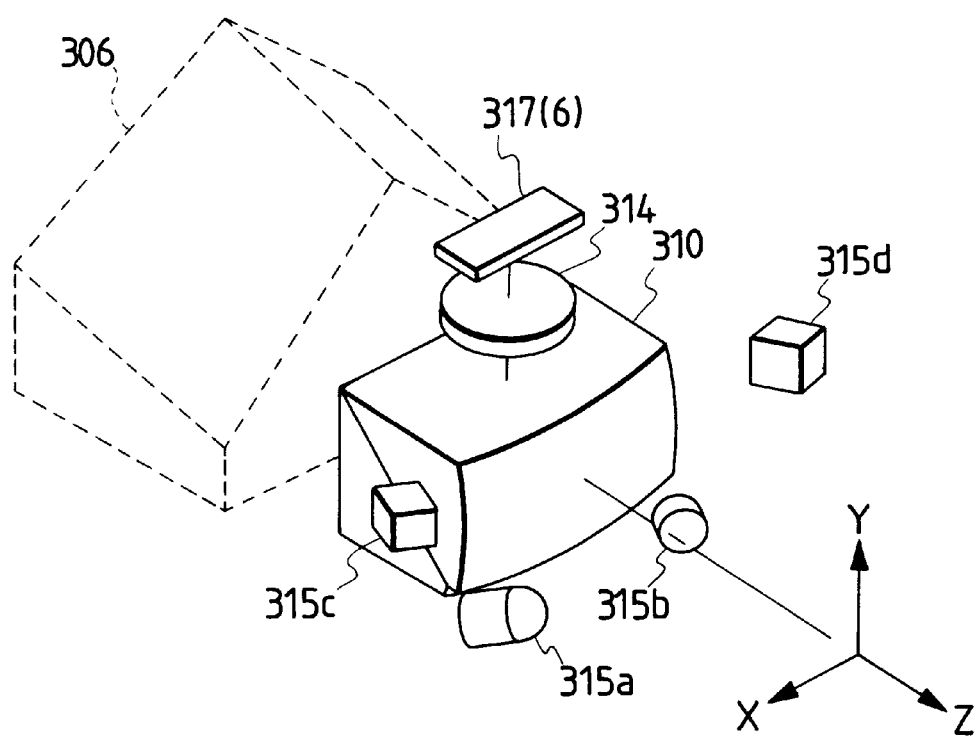
FIG. 18 is a perspective view showing a visual axis detection system.

In FIGS. 16, 17 and 18, reference numeral 310 designates an eye piece lens in which a dichroic mirror 315a capable of transmitting visible light while reflecting infrared light is diagonally provided to dually serve as a optical path splitter.

A reference numeral 314 designates a light receiving lens; 315a, 315b, 315c, and 315d, the illuminating means such as light emitting diodes, of which the 315a and 315b are the infrared light emitting diodes arranged below the eye piece lens 310 to generate the cornea reflection, these light emitting diodes being of an apparently small chip size having good spot making properties in order to detect the cornea reflection image in the best resolution, and the 315c and 315d are also infrared light emitting diodes arranged on the upper part of both sides of the eye piece lens 310, having diffusion so that the entire eye ball is illuminated or having the characteristic properties of surface emission, thus providing an illuminating area which sufficiently covers the eye ball even if it is displaced from its optical center. In this respect, the area sensor 314 for detecting the cornea information, which comprises a plurality of photoelectric converting element arrays 316, is diagonally arranged in a position where no cornea reflection image is formed by the light receiving lens 314.

The light receiving lens 314 and the area sensor 317 (photoelectric conversion element array 316) constitute one element of the light receiving means.

The visual axis detection system for the eyeball comprises each of the elements 310, 114, 315, 316, and 317.

A numeral reference 301 designates a photographing lens; 302, a quick return (QR) mirror; 303, an indication element; 304, a focusing plate; 305, a condenser lens; 306, a pentagonal roof prism; 307, a submirror; and 308, a multi-point focus detection apparatus which selects the plural sections of the photographing image for the focal point detection.

The above-mentioned multi-point focus detection apparatus 308 is not directly concerned with the present invention. Here, therefore, the description will be made only of its structure in brief.

In other words, in the present embodiment, there are provided as shown in FIG. 17 a field mask 318a having a plurality of slits for determining the respective distance measuring regions, which is arranged in the vicinity of the expected image formation plane of the photographing lens 301; a lens member 318b which is arranged close to the mask for executing the field lens function for the image in each of the slits; a pair of reimaging lenses 319 corresponding to the number of the slits; and a pair of photoelectric conversion element arrays in that order. Thus, the known multi-point focus detection system is structured by each of the field mask 318a, lens member 318b, reimaging lens pair 319, and photoelectric conversion element array pair 320.

In the present embodiment, a part of the light from an object which passes the photographing lens 301 is reflected by the QR mirror 302 to form the objective image in the vicinity of the focusing plate 304. The light from the object which is dispersed on the dispersion surface of the focusing plate 304 is conducted to the eye point E through the condenser lens 305, pentagonal roof prism 306, and eye piece lens 310.

Here, the indication element 303 is a double-layered guest-host type liquid crystal element which does not use any polarization plate, and displays a plurality of distance measuring regions (focal point detecting positions) in the finder view.

Also, a part of the light from the object which passes the photographing lens 301 is transmitted through the QR mirror 302, and is reflected by the submirror 307, thus being guided to the foregoing multi-point focus detection apparatus 308 which is arranged on the bottom part of the camera main body. Then, on the basis of the focal point detection information regarding the positions on the object surface selected by the multi-point focus detection apparatus 308, the photographing lens is driven forward or backward by a photographing lens driving apparatus which is not shown for the execution of the focus adjustment. The signal processing circuit 309 for the visual axis detection is the so-called one chip microcomputer (hereinafter referred to as MCU). This is a member which is the same as the CPU 100 shown in FIG. 4, and comprises a ROM, RAM, A/D converter, and others incorporated in it. The MCU 309 executes a series of visual axis detecting operation in accordance with the program stored in the ROM.

Now, the procedures of the visual axis detection will be described in brief.

At first, the infrared light emitting diodes 315a to 315d are illuminated. The infrared light projected here illuminates the eyeball 15 of the observer positioned in the vicinity of the eye point E. Also, the reflected infrared light by the eyeball 15 is reflected by the dichroic mirror 310a, thus forming an image by the light receiving lens 314 on the photoelectric conversion element array 316. The MCU 309 processes the signals of the eyeball image which are photoelectrically converted by the photoelectric conversion element array 316 in order to detect the target point information (visual axis).

The detected target point information is utilized for the multi-point focus detection as well as for display operation. In other words, on the basis of the focal point detection result of the measuring distance point closest to the target point, the focus adjustment is executed, and at the same time, the location aimed at by the observer is indicated in the finder of the camera by means of the indication element 303 so that the observer can confirm the target point.

Figure 19A:
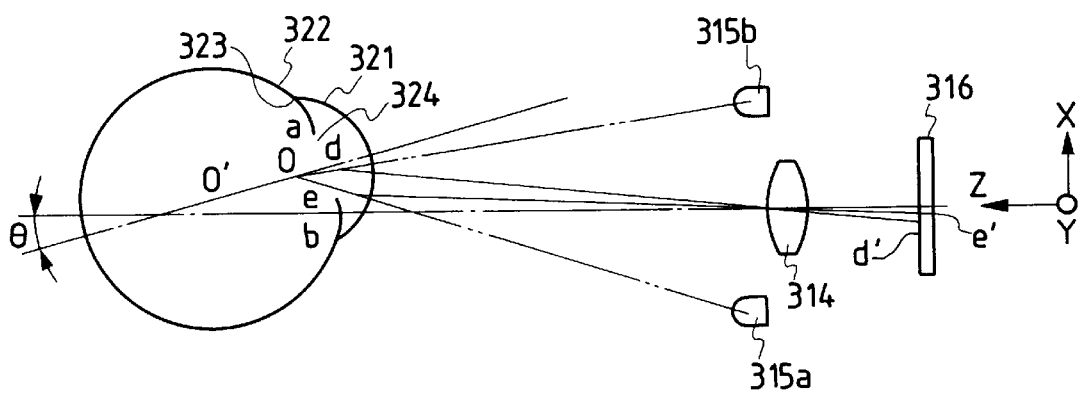
FIGS. 19A and 19B are views illustrating a visual axis detection method.
Figure 19B:
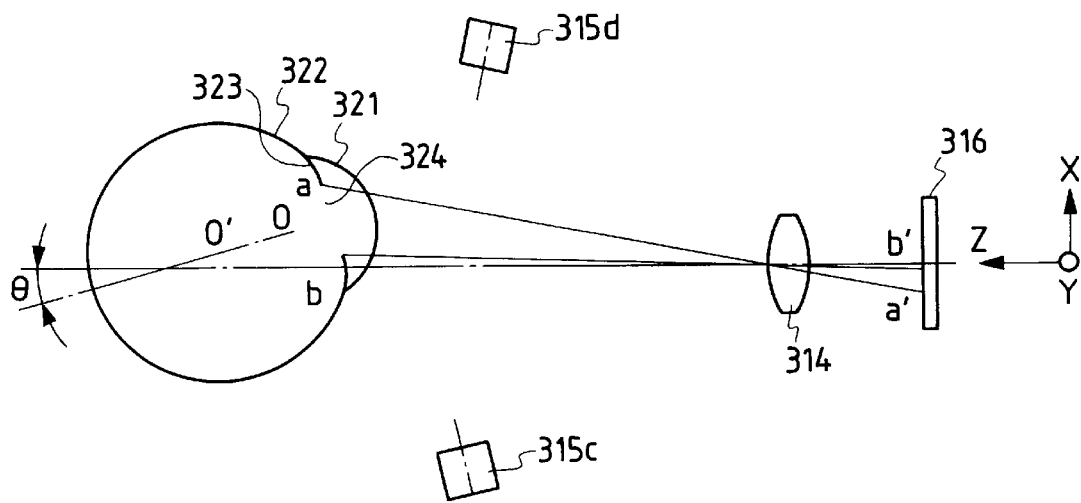

FIGS. 19A and 19B are views showing the optical arrangement for detecting the visual axis.

In FIG. 19A, the luminous fluxes from the infrared diodes 315a and 315b, which are arranged separately in the photoelectric conversion element array 316 in the horizontal direction (X axis direction), form the cornea reflection images e and d in each of the separated positions in the X axis direction. At this juncture, the central point of the X coordinates of the cornea reflection images e and d agrees with the X coordinates of the curvature center O of the cornea 321. Also, the interval between the cornea reflection images e and d changes corresponding to the distance between the observer's eye ball and the infrared light emitting diodes 315a and 315b. Therefore, by detecting the positions e' and d' of the cornea reflection images d and e which are reimaged on the photoelectric conversion element array 316, it is possible to obtain the imaging magnification $\beta$ of the reflection images from the eye ball.

The infrared light emitting diodes 315c and 315d for the iris information detection dispersively illuminate the eye ball in the side end direction of the finder, but these diodes are arranged so that no cornea reflection image is reimaged by the light receiving lens 314 on the photoelectric conversion element array 316. In this way, no flare reflection image by any undesirable light is incident upon the boundary positions a' and b' between the iris 223 and pupil 324, hence preventing the detection accuracy of the boundary positions a' and b' from being lowered. In this respect, the infrared light emitting diodes 315c and 315d are to enhance the uniformity of the illumination. It may be possible to omit them.

The reflection image of the eye ball projected on the area sensor 317 which comprises a plurality of photoelectric conversion element array 316 is the same as the one shown in FIG. 1A.

As described earlier, the MCU 309 detects the central position of the pupil and the positions of the cornea reflection images e' and d' by the sensor signals, and then, detects the target point (visual axis) based upon the relationship between these positions.

Now, the description will be made of the visual axis detection executed by the above-mentioned MCU 109 in accordance with the flowcharts shown in FIG. 20 to FIG. 24. However, since the contents of these flowcharts often duplicate those of the flowcharts shown in FIG. 6 to FIG. 11B, the same steps are referenced by giving the same numbers while the similar steps are referenced by giving dash to the corresponding numbers.

Figure 20:
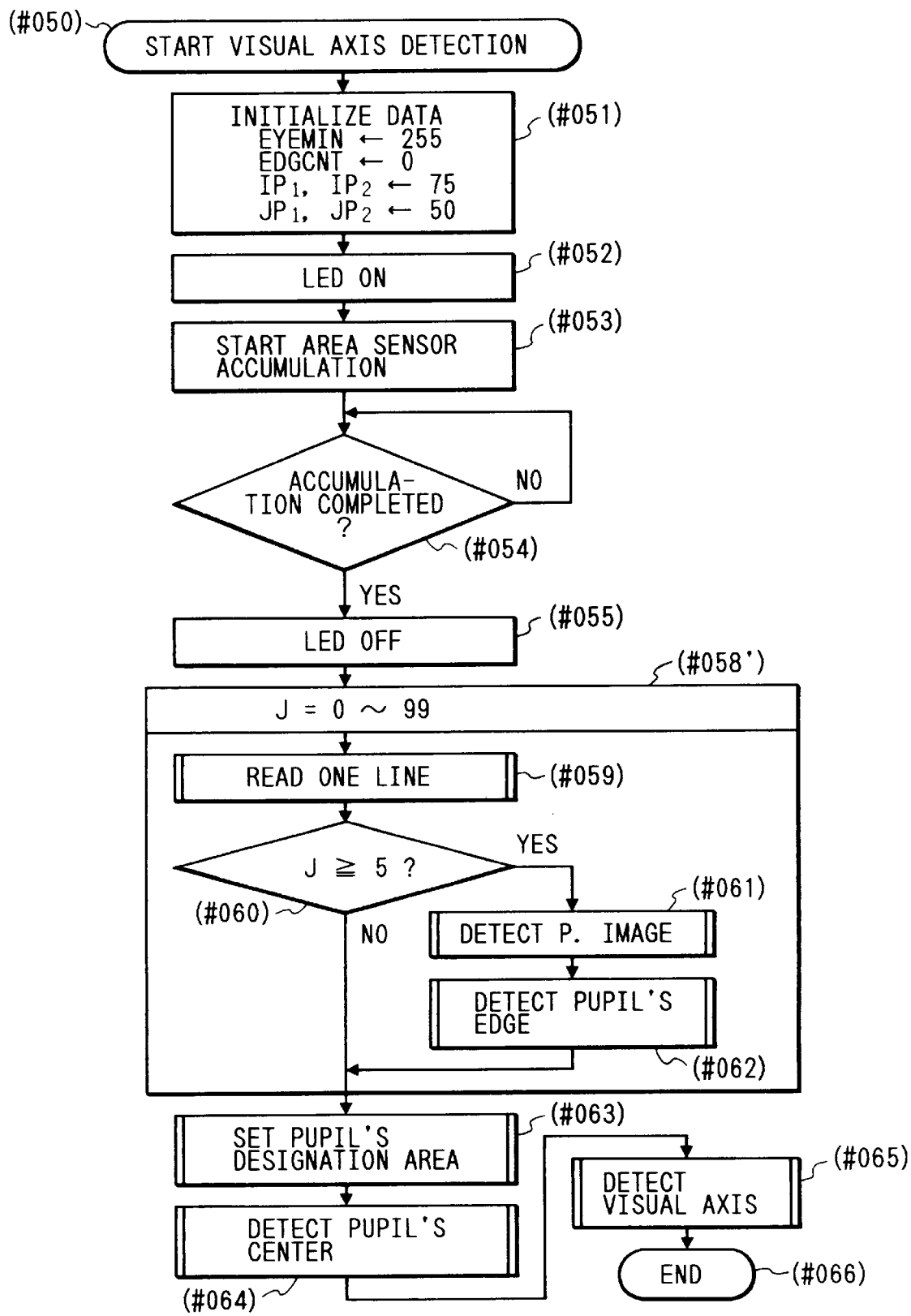
FIG. 20 is a flowchart related to a second embodiment.

FIG. 20 is a flowchart showing the main operation of the visual axis detection. This corresponds to FIG. 6.

When the MCU 309 start the visual axis detecting operation, the process will proceed to step (#051) through step (#50) to initialize various data (variables).

Here, the variable EYEMIN is to record the minimum value of luminance in the photoelectric conversion signals of the eye ball reflection image. Assuming that the resolution of the A/D converter incorporated in the MCU 309 is eight bits, the minimum values are sequentially compared and updated as the image signals being read. The initial value is "255" which represents the maximum value at eight bits.

The variable EDGCNT is to count the extracted numbers of the boundaries between the iris 23 and pupil 24 as edges.

The variables IP1, IP2, JP1, and JP2 are to represent the positions of the cornea reflection images (hereinafter referred to as P images: Purkinje images) of the light emitting diodes 315a and 315b. There are two P images are present in the area of the eyeball reflection image surrounded by the region IP1 to IP2 in the horizontal direction (X axis) and the region JP1 to JP2 in the vertical direction (Y axis).

Now, it is assumed that the pixel numbers of the area sensor 7 are 150 in the horizontal direction and 100 in the vertical direction, and the variables IP1, IP2, JP1, and JP2 store the position (75, 50) which is just the center of the total pixels as an initial value.

After the data are initialized, the process will proceed to step (#052).

In the step (#052), the P image light emitting diodes (LED) 315a and 315b and the eye ball illumination light emitting diodes 315c and 315d are turned on. Then, in the next step (#053), the accumulating operation of the area sensor 7 is actuated. This accumulation control is not directly concerned with the present invention. Therefore, its detailed description will be omitted. In the present embodiment, however, it is driven for control by a sensor interface which is not shown.

In step (#054), the process will wait for the completion of the accumulation of the area sensor 7. Then, when the given charge accumulation is completed, the light emitting diodes 315a to 315d are turned off in the next step (#055).

Now, in step (#058') and on, the area sensor 7 begins reading the photoelectric conversion signals.

In the step (#058'), the in-frame processes are executed while the loop variable J is being counted up from 0 to 99. This represents the so-called "loop processes".

Figure 21:
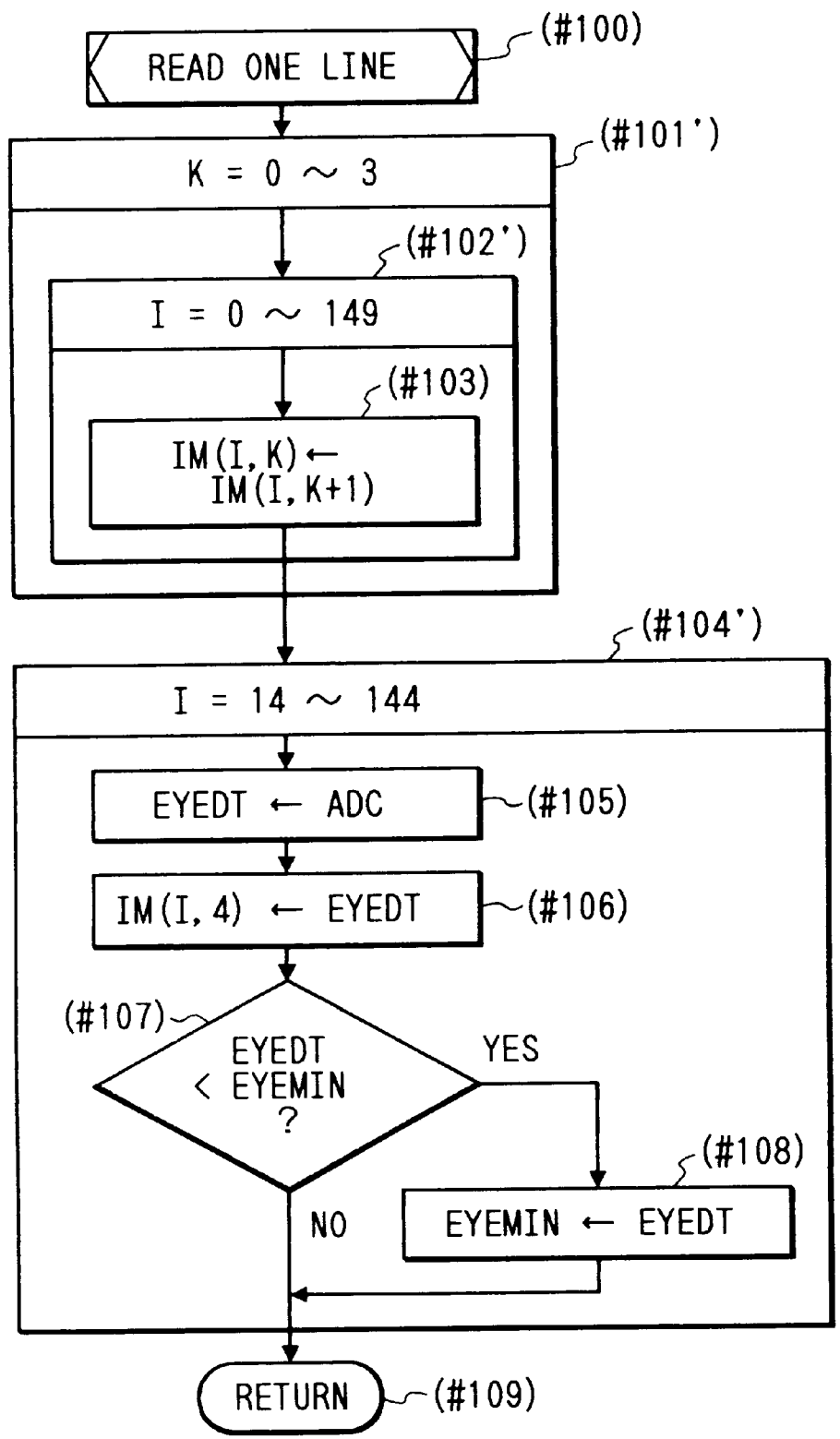
FIG. 21 is a flowchart showing a one-line reading operation.

In the loop processes in the step (#058'), a one-line portion of the photoelectric conversion signals of the area sensor 7 in the horizontal direction (X axis) is read in step (#059) at first. The one-line reading is of a subroutine type. In FIG. 21, a flowchart is shown for this "one-line reading" subroutine.

When the "one-line reading" subroutine is called, the next step (#101) will be executed through step (#100) as shown in FIG. 21. The step (#101) and the in-frame step (#102) in it represent the loop processes which are the same as those in the foregoing step (#006). In the step (#101), while the variable K is being counted up from 0 to 3, and the variable I, from 0 to 149, each of the in-frame processes will be executed. Therefore, the step (#101) and step (#102) represent the so-called "nested" loop processes for the variable K and variable I.

In step (#103) in the loop processes in the step (#102), the re-storing operation of the array variable IM (I, K) is executed.

In the present embodiment, the MCU 309 which is a microcomputer executes the signal processing. In general, however, the storage capacity of a RAM (random access memory) incorporated in a microcomputer is not large enough to store the entire pixel information of the area sensor 7 at a time. In the present embodiment, therefore, only the newest image signals equivalent to a five-line portion in the horizontal direction (X axis) is stored in the RAM in the MCU 309 while reading the image signals sequentially output from the area sensor 7, and then, the process is executed for visual axis detection per one-line reading.

The contents of the double loop processes executed in the steps (#101) to (#103) are the operations to update the five-line portion image signal data which have been stored in the past, which is required in order to read the new one-line portion of the image signals. In other words, in the array variable IM (I, K), the IM (I, 0) [I=0 to 149] represents the oldest one-line image data while the IM (I, 4) [I=0 to 149], the newest one-line, and it is prepared to update the data as follows so that the new one-line portion of the image signals can be stored in the IM (I, 4) [I=0 to 149]:

IM (I, 0)←IM (I, 1)

IM (I, 1)←IM (I, 2)

IM (I, 2)←IM (I, 3)

IM (I, 3)←IM (I, 4)[I=0 to 149]

Now, the loop processes for updating the data in the steps (#101) to (#103) are completed, the loop process in the next step (#104) will be executed.

In the loop processes in the step (#104'), The image signals for a one-line portion (150 pixels) of the area sensor in the horizontal direction (X axis) are stored in the RAM while being A/D converted. The lowest value of the image signals is also detected.

In the first step (#105) in the loop in the step (#104'), the digital value ADC which is obtained by A/D converting the image signals is fetched from the A/D converter incorporated in the MCU 109, and stored temporarily in the variable EYEDT. Then, in the next step (106), the value of the EYEDT is stored in the array variable IM (I, 4). The variable I is counted up from 14 to 144 in the outer loop processes in the step (#104).

This sets only the detection area between the pupil's edge and the P images because the lowest luminance is positioned between them as shown at 14 in FIGS. 5A and 5B.

In steps (#107) and (#108), the lowest value of the image signals is detected.

The variable EYEMIN is to hold the lowest value of the image signals, and in the step (#107), if the EYEDT is smaller than the EYEMIN, the process will branch to step (#108) to update the EYEMIN by the value of this smaller EYEDT.

When the loop processes in the steps (#104) to (#108) are completed, and also, the storage of the new one-line portion of the image signals and the detection of the lowest value are completed, the process will return from the "one-line reading" subroutine.

Reverting to the flowchart shown in FIG. 6, when the "one-line reading" subroutine in the step (#007) is completed, the process will proceed to the next step (#008) to examine whether or not the loop variable J for the outer loop processing step (#006) is five or more.

The loop variable J represents the pixel line of the area sensor in the vertical direction (Y axis). In the present embodiment, since the pixel number of the area sensor is (150×100), the variable J is being counted up from 0 to 99.

The description of the steps (#060) to (#066) are the same as the description which has been made in conjunction with FIG. 6.

Figure 22:
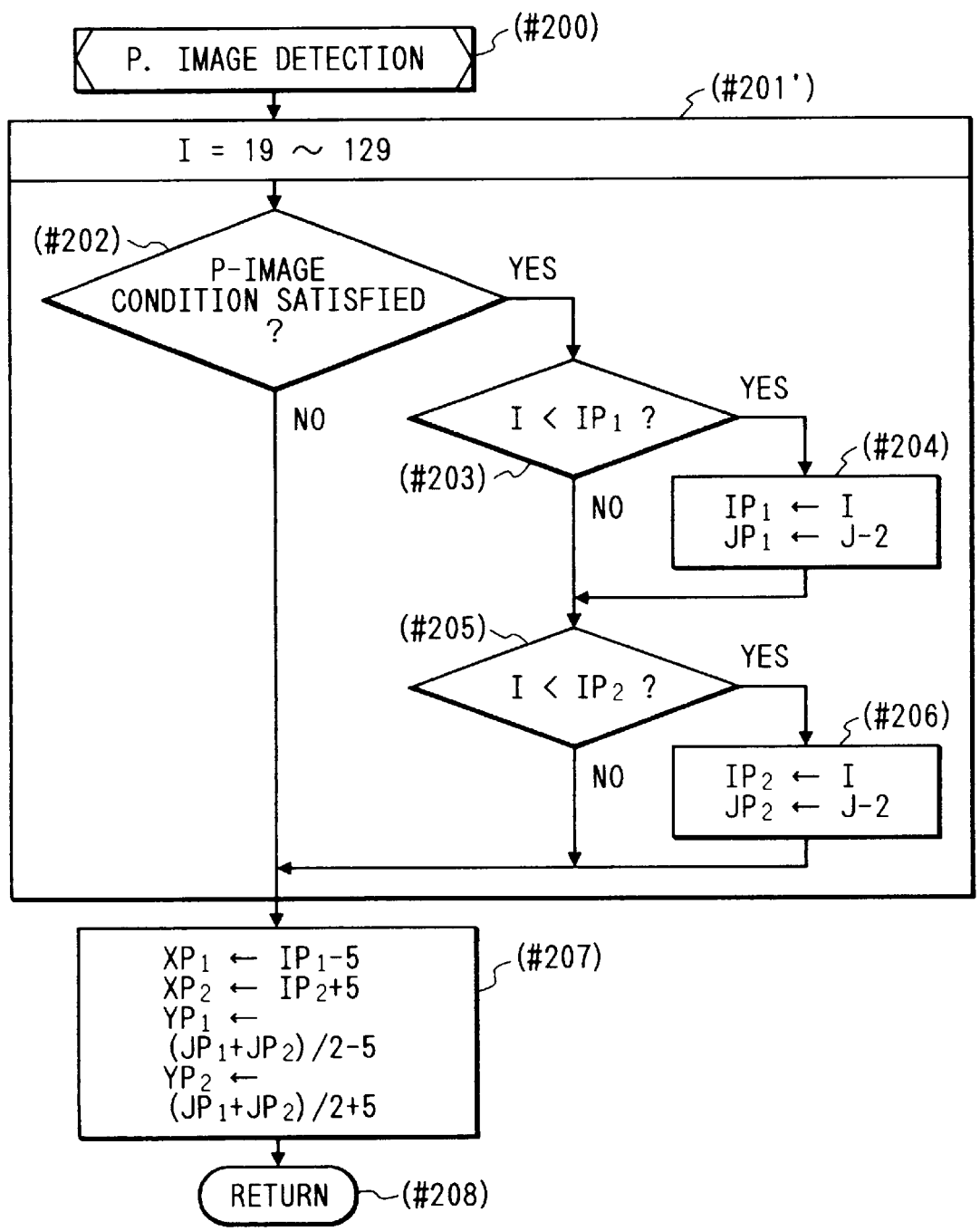
FIG. 22 is a flowchart showing a P image detecting operation.

Then, the flowchart shown in FIG. 22 corresponds to the one shown in FIG. 8, and is almost identical. The step (#201') represents the loop processes which are characteristic in the present embodiment. When the one-line portion the position I of which is from 19 to 129 in the horizontal direction (X axis) is executed, the process will proceed to the next step (#207).

Figure 25:
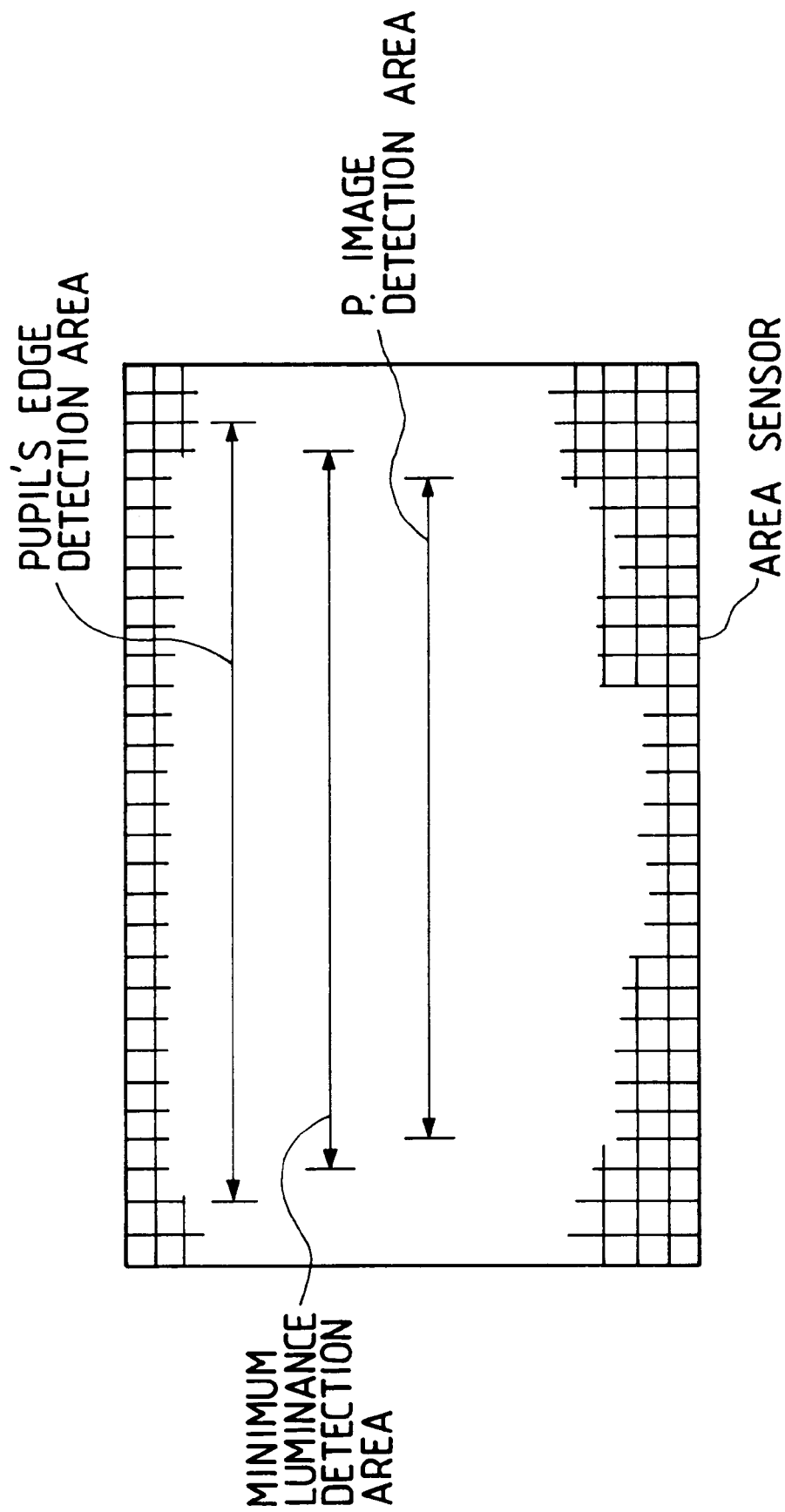
FIG. 25 is a view illustrating the ranges of characteristic point detection.

Here, as shown in FIG. 25, since the P images are positioned in the innermost side with respect to the other characteristic points the detection area is narrow.

Having executed the step (#207) completely, the process will return from the "P image detection" subroutine in the next step (#208).

Figure 23:
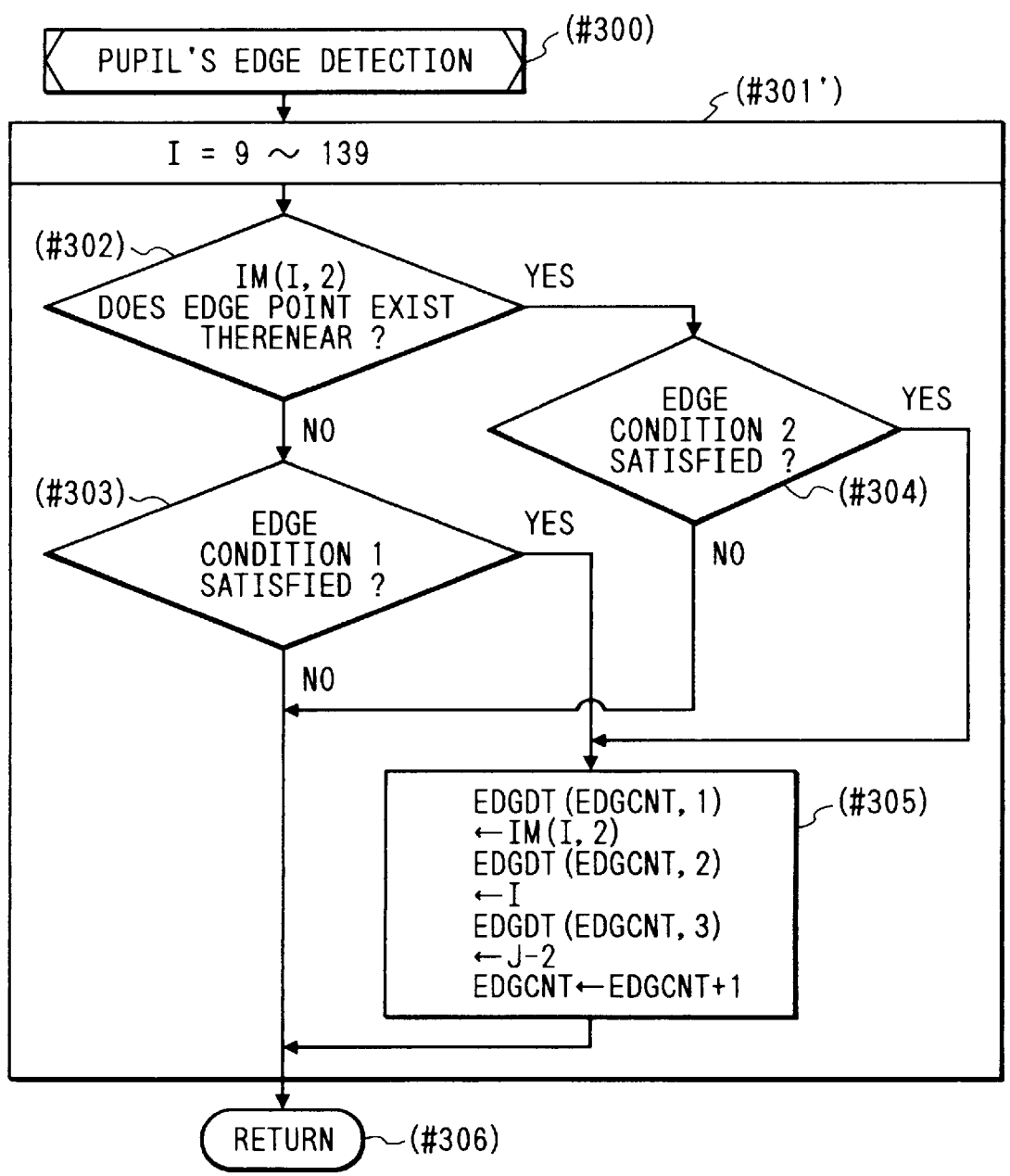
FIG. 23 is a flowchart showing a pupil's edge detecting operation.

Again reverting to the flowchart shown in FIG. 20, the "pupil's edge detection" subroutine will be executed in the next step (#063) (see FIG. 23). This subroutine is also similar to the one shown in FIG. 9. Therefore, the description made in conjunction with FIG. 9 will be cited.

Then, the loop processes are executed in step (#301) while the variable I is from 9 to 139. When the one-line portion of the area sensor 7 in the horizontal direction (X axis) has been executed, the process will proceed to step (#306) to return from the "pupil's edge detection" subroutine.

Here, the detection area for the pupil's edge is the widest with respect to the other characteristic points as shown in FIG. 25.

Again reverting to the description of FIG. 20, when the "pupil's edge detection" subroutine is completed in the step (#062), the loop variable J (representing the area sensor 7 in the vertical direction: Y axis coordinates) for the outer loop processing step (#058') is counted up, and until it becomes 99, the processes in the step (#059) and on will again be executed.

When the loop variable J has become 99, and the reading and processing of the entire pixels of the area sensor 7 are completed, the process will proceed from the step (#058') to step (#063).

In steps (#063) to (#065), the central coordinate of the pupil 324 and visual axis are detected in accordance with the P image positions and pupil's edge information detected in the loop processes in the step (#058').

The "pupil's assumption area setting" subroutine in the step (#063) is as described in conjunction with FIG. 10. Therefore, this description will be cited.

Figure 24:
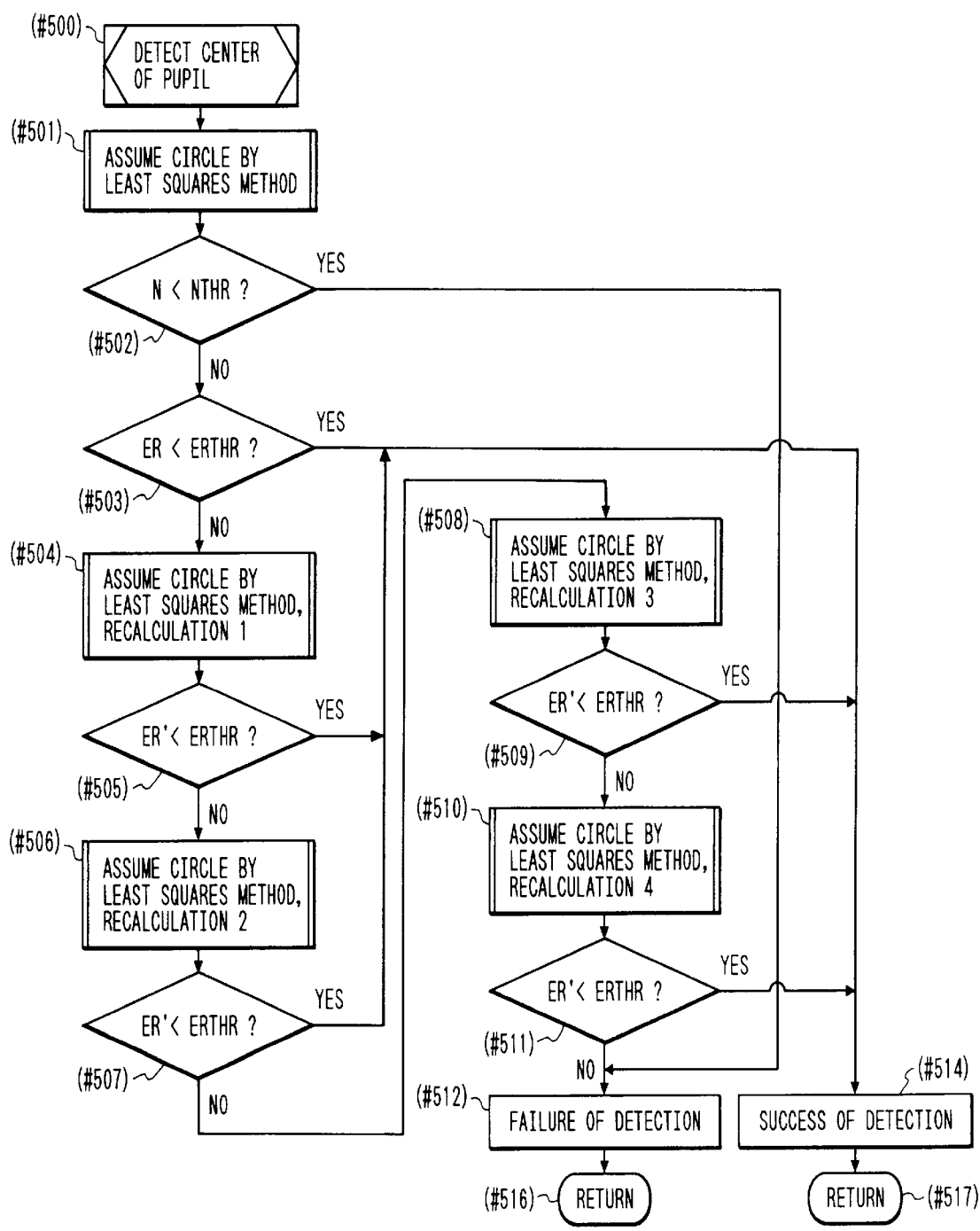
FIG. 24 is a flowchart showing a pupil's center detecting operation.

Also, the "pupil's center detection" subroutine in the step (#064) is shown in FIG. 24, but with the exception of the steps (#516) and (#517), this is also identical to the one described in FIGS. 11A-1 and 11A-2. Therefore, such description will be cited. Also, the "least square method" used in this subroutine is the same as the one already described.

Now, reverting to FIG. 20, when the "pupil's center detection" in the step (#064) is completed, the process will proceed to step (#065) to call the "visual axis detection" subroutine.

The "visual axis detection" subroutine is to detect the visual axis (target point) based upon the P image positions and the central position of the pupil's circle which have been detected by the processes so far.

Fundamentally, it will suffice if only the rotational angle θ of the optical axis of the eye ball is calculated in accordance with the above-mentioned equation (2).

In the present embodiment, since the pupil's center is two-dimensionally detected in the horizontal direction (X axis) and vertical direction (Y axis), it is possible not only to detect the horizontal direction as in the known example, but also to detect the visual axis direction in the vertical direction in the same concept as in the detection in the horizontal direction.

When the visual axis detection is completed, the process will proceed to step (#066) to terminate the series of the processes.

Here, in the present embodiment, a restriction is provided for the positional detection area of the characteristic points (the lowest luminance, pupil's edge, and P images) only in the horizontal direction in order to shorten the period of the detection time, but it may be possible to set a restriction for the detection area in the vertical direction, thus enabling the detection period of time to be shortened still more. Also, in the present embodiment, in order to save the memory, the sequential process is exemplified, but if more memory can be prepared, there is no need for the sequential process.

According to the present embodiment, when the positional information regarding the characteristic points of the eye ball (the lowest luminance, pupil's edge, and Purkinje images) is detected, an appropriate restriction is set for the detection area corresponding to each of the characteristic points. It is, therefore, possible to implement the reduction of time required for the detection. In this respect, the restricted detection area corresponding to each of the characteristic points means the detection area which can be provided by making an arrangement so that the pupil's edges rarely present in the extreme end portions of the area sensor; the lowest luminance exists in the inner side of the pupil's edge; and the Purkinje images (P images) are present in the inner side of the lowest luminance as readily understandable from FIGS. 5A and 5B.

As described above, according to the present embodiment, the detection area controlling means, which restricts each of the detection areas correspondingly to each of the characteristic points at the time of detecting the characteristic points of the eyeball, is provided in the characteristic point positional detection means so that the detection is not necessarily executed over the entire information obtainable by light receiving means when the positional information regarding the eyeball characteristic points (the lowest luminance, pupil's edge, and Purkinje images) is detected, but the detection areas are restricted to the areas corresponding to the respective characteristics.

As a result, it is possible to significantly reduce the detection time required for obtaining the positional information regarding the characteristic points of the eyeball which are needed for the visual axis detection.

What is claimed is:

1. An apparatus comprising:
   light receiving means for receiving an image of an observer's eye and for outputting photoelectric conversion signals;
   read-out means for reading out photoelectric conversion signals from a read-out area of said light receiving means in a first read out step and in a second read out step, said read out means including means for changing photoelectric conversion signals into digital signals;
   limitation means for limiting the read-out area of said light receiving means, said limitation means determining a position of a pupil in the image of the observer's eye based on digital signals read out by said read-out means in a first read-out step, to limit the read-out area of said light-receiving means in a second read-out step to within an area smaller than the entire read-out area, said smaller area corresponding to an area lying around a center of the pupil, such that said read-out means changes the photoelectric conversion signals from the entire read-out area into digital signals in the first read-out step, and changes only photoelectric conversion signals from said smaller area to digital signals in the second read-out step; and
   information processing means for extracting characteristic information including a plurality of characteristics on the basis of photoelectric conversion signals read out by said read-out means, and for outputting information regarding the direction of the observer's visual axis.

2. An apparatus according to claim 1, wherein said read-out means repeatedly executes the read-out a plural number of times, and said limitation means is actuated at a second time that the read-out is executed or thereafter.

3. An apparatus according to claim 1, wherein said limitation means defines the read-out area on the basis of an area having a predetermined length from the pupil's center.

4. An apparatus according to claim 1, wherein said limitation means defines the read-out area on the basis of an average length having a certain multiple of the radius of the pupil.

5. An apparatus according to claim 1, wherein said light receiving means includes an area type solid-state imaging element.

6. An apparatus according to claim 1, wherein the characteristic information relates to one or more of Purkinje images, a pupil's edge portions, and lowest luminance positions.

7. An apparatus according to claim 1, wherein said information processing means has a function to determine whether a proper information can be formed in regard to the visual axis direction or not, and when any proper information cannot be formed, a restriction is returned to its initial value by said limitation means.

8. A visual axis detection apparatus comprising:
   illuminating means for illuminating an observer's eyeball;
   light receiving means for receiving an eyeball image of the observer, detecting a distribution of luminous intensity in a two-dimensional direction, and outputting photoelectric conversion signals;

read-out means for reading out photoelectric conversion signals which are output from a read-out area of said light receiving means, said read-out means including means for changing photoelectric conversion signals into digital signals, and limitation means for determining a position of a pupil in the eyeball image based on digital signals output by said read-out means in a first read-out step, to limit the read-out area of said light-receiving means within an area smaller than the entire read-out area in a second read-out step, said smaller area corresponding to an area lying around a center of said pupil, such that said read-out means chances the photoelectric conversion signals from the entire read-out area into digital signals in the first read-out step, and changes only photoelectric conversion signals from said smaller area to digital signals in the second read-out step cornea reflection image detection means for detecting a cornea reflection image of a light source from the observer's eyeball image; and means for detecting the observer's visual axis by a positional relationship between the pupil portion and the cornea reflection image.

9. A visual axis detection apparatus according to claim 8, wherein said limitation means designates an area having a certain multiple of the radius of said pupil.

10. A visual axis detection apparatus according to claim 8, further comprising determining means for determining whether or not said means for detecting the observer's visual axis is able to detect the observer's visual axis, wherein said limitation means resets an initial value in accordance with the result of said determining means.

11. A visual axis detection apparatus comprising:

light receiving means formed by a plurality of photoelectric conversion elements receiving reflection light reflected by an observer's eyeball;

first storage means for storing information from said light receiving means;

characteristic point position detecting means for detecting positional information of a plurality of characteristic points of the eyeball in accordance with information stored in said first storage means;

second storage means for storing positional information detected by said characteristic point position detecting means;

detecting means for detecting the visual axis on the basis of the positional information stored in said second storage means; and detection area limitation means which is arranged in said characteristic point position detecting means for limiting the detection area to a plurality of different areas of said light receiving means each of which respectively corresponds to one of the plurality of characteristic points when the characteristic points of the eyeball are detected.

12. A visual axis detection apparatus according to claim 11, wherein the characteristic points relate to one or more of Purkinje images, a pupil's edge portions, and lowest luminance positions.

13. An optical apparatus comprising:

control means for controlling at least one predetermined function;

light receiving means for receiving an image of a user's eye, and for outputting photoelectric signals;

read-out means for reading out photoelectric signals from a read-out area of said light receiving means in a first read out step and in a second read out step, said read out means including means for changing photoelectric conversion signals into digital signals;

limitation means for limiting the read-out area of said light receiving means, said limitation means determining a position of a pupil in the image of the user's eye based on digital signals read out by said read-out means in a first read-out step, to limit the read-out area of said light-receiving means in a second read-out step to within an area smaller than the entire read-out area, said smaller area corresponding to an area lying around a center of the pupil, such that said read-out means chances the photoelectric conversion signals from the entire read-out area into digital signals in the first read-out step, and changes only photoelectric conversion signals from said smaller area to digital signals in the second read-out step; and information processing means for extracting characteristic information including a plurality of characteristics on the basis of photoelectric signals read out by said read-out means, and for outputting information regarding the direction of the user's visual axis from said plurality of characteristics for use of control by said control means; and limitation means for giving a restriction to the read-out area of said light receiving means.

14. An optical apparatus according to claim 13, wherein said read-out means repeatedly executes the read-out plural times, and said limitation means is actuated at a second time that the read-out is executed or thereafter.

15. An optical apparatus according to claim 13, wherein said apparatus further includes an imaging optical system.

16. An optical apparatus according to claim 15, wherein said apparatus further comprises focal point detecting means for executing the focal point detection with respect to a plurality of areas of the imaging fields of said optical imaging system, respectively, and said predetermined function is to operate said focal point detecting means.

17. An optical apparatus according to claim 15, wherein said apparatus further comprises photometric means for separating the imaging field of said imaging optical system into a plurality of areas, and executing the photometry for each of the areas independently, and said function is to determine the exposure value of said imaging optical system by providing weight for the photometric values of said photometric means.

18. A visual axis detection apparatus comprising:

means for illuminating an eye;

an image forming optical system for forming an image of said illuminated eye on a photoelectric conversion element array having a plurality of photoelectric conversion elements; and signal processing means for obtaining a direction of a visual axis of said eye based on a signal from each of said plurality of photoelectric conversion elements, said signal processing means detecting a position of a center of a pupil and a position of a cornea reflection image, in said image of said eye by using said signals to obtain said direction of the visual axis from these positions;

wherein when said position of the center of said pupil is detected, then a number of said elements using the signals therefrom is set to be smaller than a number of all elements of said photoelectric conversion element; and when said position of said cornea reflection image is detected, then a number of said elements using the signals therefrom is set to be smaller than the number of elements when said position of the center of said pupil is detected.

19. An apparatus according to claim 18 in which said elements using said signals therefrom when said position of center of said pupil is detected are a plurality of elements lying in an area which is larger than said pupil but which is limited in said photoelectric conversion element array and said elements using said signals therefrom when said position of said cornea reflection image is detected are a plurality of elements lying in an area which is smaller than said pupil in said photoelectric conversion element array.

20. An apparatus according to claim 19 in which:

said illuminating means illuminates said eye with lights from two light sources, and said signal processing means detects positions of two cornea reflection images corresponding to each of said two light sources in said image of said eye, wherein said direction of the visual axis is obtained based on a difference between an intermediate position between said two cornea reflection images and a position of the center of said pupil.

21. An apparatus according to claim 20 in which:

analog signals from each of said plurality of elements of said photoelectric conversion element array are converted to digital signals to store each of said digital signals into a memory, and the direction of said visual axis is obtained by using each of said digital signals of said plurality of elements stored in said memory.

22. A visual axis detection apparatus comprising;

means for illuminating an eye;

an image forming optical system for forming an image of said illuminated eye on a photoelectric conversion element array having a plurality of photoelectric conversion elements; and signal processing means for obtaining a direction of a visual axis of said eye based on a signal from each of said plurality of elements of said photoelectric conversion array, wherein said signal processing means detects a position of a center of a pupil and a position of a cornea reflection image, in said image of said eye by using said signals to obtain said direction of the visual axis from these positions;

wherein said signal processing means determines said elements using said signals therefrom when said position of the center of said pupil is detected and said elements using said signals therefrom when said position of said cornea reflection image is detected, based on a result of detection of said position of the center of said pupil in said image of said eye, wherein a number of said elements when said position of the center of said pupil is detected is smaller than a number of all elements of said photoelectric conversion element and a number of said elements when said position of said cornea reflection image is detected is smaller than a number of said elements when said position of the center of said pupil is detected, and wherein, when said direction of the visual axis is obtained after said elements used in each detection of said position of the center of said pupil and detection of said position of said cornea reflection image are determined, said position of said center of said pupil is detected based on outputs of said elements for detecting said position of the center of said pupil in said photoelectric conversion element array and said position of said cornea reflection image is detected based on outputs of said elements for detecting said position of said cornea reflection image in said photoelectric conversion element array.

23. An apparatus according to claim 22 in which:

said elements using said signals therefrom when said position of the center of said pupil is detected are a plurality of elements lying in an area which is larger than said pupil but which is limited in said photoelectric conversion element array, and said elements using said signals therefrom when said position of said cornea reflection image is detected are a plurality of elements lying in an area which is smaller than said pupil in said photoelectric conversion element array.

24. An apparatus according to claim 23 in which:

said illuminating means illuminates said eye with lights from two light sources, and said signal processing means detects positions of cornea reflection images corresponding to each of said two light sources in said image of said eye, wherein said direction of the visual axis is obtained based on a difference between an intermediate position between said two cornea reflection images and the position of the center of said pupil.

25. An apparatus according to claim 24 in which:

analog signals from each of said plurality of elements of said photoelectric conversion element array are converted to digital signals to store said digital signals into a memory and a direction of said visual axis is obtained by using said digital signals of each of said plurality of elements stored in said memory.

26. Equipment having a visual detection apparatus of any of claim 18 to 25, where in a function thereof is controlled according to said obtained direction of the visual axis.

27. An equipment according to claim 26 including a finder having an eyepiece.

28. A camera having a visual detection apparatus of any of claims 18 to 25, wherein a function thereof is controlled according to said obtained direction of the visual axis.

29. An equipment according to claim 28 including a finder having an eyepiece.

* * * * *

UNITED STATES PATENT AND TRADEMARK OFFICE
CERTIFICATE OF CORRECTION

PATENT NO. : 6,035,054
DATED : March 7, 2000
INVENTOR(S) : Yukio Odaka, et al.

Page 1 of 2

It is certified that error appears in the above-identified patent and that said Letters Patent is hereby corrected as shown below:

Title page,
Item [57], ABSTRACT, "light" should read -- a light --.
"image" should read -- an image --.

Column 1,
Line 13, "film, a" should read -- film --.

Column 3,
Line 45, "Judging" should read -- judging --.

Column 7,
Line 8, "CCD-R2which" should read -- CCD-RS which --.

Column 8,
Lines 2, 34, and 42, "eye ball" should read -- eyeball --.

Column 9,
Line 5, "the" should read -- this --.

Column 11,
Line 10, "to transmits" should read -- transmits --.
Line 48, "seconds" should read -- time --.
Line 66, "eye ball" should read -- eyeball --.

Column 13,
Line 13, "a" should read -- one --.

Column 16,
Line 52, "(I9,3)" should read -- (I,3) --.

Column 17,
Line 13, "detect" should read -- detected --.

Column 20,
Line 4, "numeral" should read -- numbered --.

Column 21,
Line 37, "numbers" should read -- number --.
Line 53, "despite" should read -- regardless of whether --.
Line 65, "is" should be deleted.

UNITED STATES PATENT AND TRADEMARK OFFICE
CERTIFICATE OF CORRECTION

PATENT NO. : 6,035,054
DATED : March 7, 2000
INVENTOR(S) : Yukio Odaka, et al.

It is certified that error appears in the above-identified patent and that said Letters Patent is hereby corrected as shown below:

Column 24,
Line 51, "in the" (both occurrences) should be deleted.

Column 25,
Line 17, "▌n" should read -- ▌in --.

Column 27,
Line 67, "eye ball." should read -- eyeball. --.

Column 28,
Lines 13, 37, and 60, "eye ball" should read -- eyeball --.

Column 30,
Line 38, "points" should read -- points, --.

Column 33,
Line 11, "chances" should read -- changes --.
Line 16, "step" shold read -- step; --.

Column 34,
Line 13, "chances" should read -- changes --.
Line 26, "means." should read -- means, said limitation means limiting the read-out area to be within a predetermined area around a center of a pupil of the user. --

Column 36,
Line 51, "where in" should read -- wherein --.

Signed and Sealed this

Twentieth Day of November, 2001

*Attest:*

*Attesting Officer*

NICHOLAS P. GODICI
*Acting Director of the United States Patent and Trademark Office*